(12) United States Patent
Schwarz et al.

(10) Patent No.: US 11,968,348 B2
(45) Date of Patent: *Apr. 23, 2024

(54) EFFICIENT MULTI-VIEW CODING USING DEPTH-MAP ESTIMATE FOR A DEPENDENT VIEW

(71) Applicant: GE Video Compression, LLC, Albany, NY (US)

(72) Inventors: Heiko Schwarz, Berlin (DE); Thomas Wiegand, Berlin (DE)

(73) Assignee: GE Video Compression, LLC, Niskayuna, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/576,873

(22) Filed: Jan. 14, 2022

(65) Prior Publication Data

US 2022/0217316 A1 Jul. 7, 2022

Related U.S. Application Data

(63) Continuation of application No. 16/871,919, filed on May 11, 2020, now Pat. No. 11,240,478, which is a
(Continued)

(51) Int. Cl.
*H04N 13/128* (2018.01)
*H04N 13/161* (2018.01)
(Continued)

(52) U.S. Cl.
CPC ......... *H04N 13/128* (2018.05); *H04N 13/161* (2018.05); *H04N 19/194* (2014.11);
(Continued)

(58) Field of Classification Search
None
See application file for complete search history.

(56) References Cited

U.S. PATENT DOCUMENTS

| 7,876,833 B2 | 1/2011 | Segall |
| 7,885,471 B2 | 2/2011 | Segall |

(Continued)

FOREIGN PATENT DOCUMENTS

| CN | 101170702 A | 4/2008 |
| CN | 101248669 A | 8/2008 |

(Continued)

OTHER PUBLICATIONS

Notice of Allowance issued in corresponding Brazilian Patent Application 11 2014 011425-0 dated Jun. 14, 2022.
(Continued)

*Primary Examiner* — Peter D Le
(74) *Attorney, Agent, or Firm* — Morgan, Lewis & Bockius LLP

(57) ABSTRACT

The usual coding order according to which the reference view is coded prior to the dependent view, and within each view, a depth map is coded subsequent to the respective picture, may be maintained and does lead to a sacrifice of efficiency in performing inter-view redundancy removal by, for example, predicting motion data of the current picture of the dependent view from motion data of the current picture of the reference view. Rather, a depth map estimate of the current picture of the dependent view is obtained by warping the depth map of the current picture of the reference view into the dependent view, thereby enabling various methods of inter-view redundancy reduction more efficiently by bridging the gap between the views. According to another aspect, the following discovery is exploited: the overhead associated with an enlarged list of motion predictor candidates for a block of a picture of a dependent view is comparatively low compared to a gain in motion vector prediction quality resulting from an adding of a motion
(Continued)

vector candidate which is determined from an, in disparity-compensated sense, co-located block of a reference view.

14 Claims, 4 Drawing Sheets

Related U.S. Application Data continuation of application No. 14/273,730, filed on May 9, 2014, now Pat. No. 10,694,165, which is a continuation of application No. PCT/EP2012/072300, filed on Nov. 9, 2012.

(60) Provisional application No. 61/558,660, filed on Nov. 11, 2011.

(51) Int. Cl.
*H04N 19/194* (2014.01)
*H04N 19/46* (2014.01)
*H04N 19/513* (2014.01)
*H04N 19/52* (2014.01)
*H04N 19/597* (2014.01)
*H04N 19/895* (2014.01)

(52) U.S. Cl.
CPC ........... *H04N 19/46* (2014.11); *H04N 19/513* (2014.11); *H04N 19/52* (2014.11); *H04N 19/597* (2014.11); *H04N 19/895* (2014.11); H04N 2213/003 (2013.01)

(56) References Cited

U.S. PATENT DOCUMENTS

| | | |
|---|---|---|
| 8,204,129 B2 | 6/2012 | He |
| 8,369,406 B2 | 2/2013 | Kim |
| 8,594,193 B2 | 11/2013 | He et al. |
| 10,887,575 B2 | 1/2021 | Schwarz et al. |
| 11,523,098 B2 | 12/2022 | Schwarz et al. |
| 2003/0138150 A1 | 7/2003 | Srinivasan |
| 2005/0157797 A1 | 7/2005 | Gaedke |
| 2007/0019726 A1 | 1/2007 | Cha |
| 2007/0223582 A1 | 9/2007 | Borer |
| 2007/0230567 A1 | 10/2007 | Wang |
| 2008/0069247 A1 | 3/2008 | He |
| 2008/0089417 A1 | 4/2008 | Bao |
| 2008/0165848 A1 | 7/2008 | Ye |
| 2008/0170618 A1 | 7/2008 | Choi |
| 2008/0198924 A1 | 8/2008 | Ho et al. |
| 2008/0205508 A1 | 8/2008 | Ziauddin |
| 2008/0211901 A1 | 9/2008 | Civanlar |
| 2008/0267291 A1 | 10/2008 | Vieron |
| 2009/0010323 A1 | 1/2009 | Su et al. |
| 2009/0015662 A1 | 1/2009 | Kim |
| 2009/0074061 A1 | 3/2009 | Yin |
| 2009/0096643 A1 | 4/2009 | Chang |
| 2009/0103616 A1 | 4/2009 | Ho |
| 2009/0175349 A1 | 7/2009 | Ye |
| 2009/0190662 A1 | 7/2009 | Park et al. |
| 2009/0290643 A1 | 11/2009 | Yang |
| 2010/0034260 A1 | 2/2010 | Shimizu et al. |
| 2010/0111183 A1 | 5/2010 | Jeon et al. |
| 2010/0158129 A1 | 6/2010 | Lai et al. |
| 2010/0189177 A1 | 7/2010 | Shimizu et al. |
| 2010/0220791 A1 | 9/2010 | Lin |
| 2010/0220795 A1 | 9/2010 | Yin |
| 2010/0260260 A1 | 10/2010 | Wiegand |
| 2010/0260268 A1 | 10/2010 | Cowan |
| 2010/0284466 A1 | 11/2010 | Pandit |
| 2010/0309292 A1 | 12/2010 | Ho et al. |
| 2010/0316139 A1 | 12/2010 | Le Leannec |
| 2010/0329342 A1 | 12/2010 | Joshi |
| 2011/0038418 A1 | 2/2011 | Pandit |
| 2011/0044550 A1 | 2/2011 | Tian |
| 2011/0090959 A1 | 4/2011 | Wiegand |
| 2011/0142138 A1 | 6/2011 | Tian |
| 2011/0222602 A1 | 9/2011 | Sung et al. |
| 2011/0286520 A1 | 11/2011 | Xu |
| 2011/0317930 A1 | 12/2011 | Kim |
| 2012/0023250 A1 | 1/2012 | Chen |
| 2012/0075436 A1 | 3/2012 | Chen |
| 2012/0082222 A1 | 4/2012 | Wang |
| 2012/0114036 A1 | 5/2012 | Po |
| 2012/0229602 A1 | 9/2012 | Chen et al. |
| 2012/0236115 A1 | 9/2012 | Zhang |
| 2012/0269270 A1 | 10/2012 | Chen |
| 2013/0229485 A1 | 9/2013 | Rusanovskyy |
| 2013/0293676 A1 | 11/2013 | Sugio et al. |
| 2013/0322536 A1 | 12/2013 | Yang |

FOREIGN PATENT DOCUMENTS

| | | |
|---|---|---|
| CN | 101491096 A | 7/2009 |
| CN | 101600108 A | 12/2009 |
| CN | 101669367 A | 3/2010 |
| CN | 101690220 A | 3/2010 |
| CN | 101690220 B | 3/2010 |
| CN | 101867813 A | 10/2010 |
| CN | 101911700 A | 12/2010 |
| CN | 101917619 A | 12/2010 |
| CN | 101986716 A | 3/2011 |
| CN | 102077246 A | 5/2011 |
| EP | 2348733 A2 | 7/2011 |
| JP | 2008-22549 A | 1/2008 |
| JP | 2009-213161 A | 9/2009 |
| JP | 2009543508 A | 12/2009 |
| JP | 2010525724 A | 7/2010 |
| JP | 2010537484 A | 12/2010 |
| JP | 2011509631 A | 3/2011 |
| KR | 1020090046826 A | 5/2009 |
| KR | 10-2029401 B1 | 11/2019 |
| KR | 10-2090106 B1 | 3/2020 |
| WO | 2007/037645 A1 | 4/2007 |
| WO | 2007081756 A2 | 7/2007 |
| WO | 2008007913 A1 | 1/2008 |
| WO | 2009005626 A2 | 1/2009 |
| WO | 2010043773 A1 | 4/2010 |
| WO | 2013/068547 A2 | 5/2013 |
| WO | 2013072484 A1 | 5/2013 |

OTHER PUBLICATIONS

Notice of Allowance issued in corresponding U.S. Appl. No. 17/129,450 dated Jul. 25, 2022.
Office Action issued in corresponding European Patent Application No. 19 195 133.4-1207 dated May 2, 2022.
Office Action (Notification of Reasons for Refusal) issued in corresponding Japanese Patent Application No. 2019-105062 dated Apr. 11, 2022, with English translation.
Non-Final Office Action issued in corresponding U.S. Appl. No. 17/129,450 dated Mar. 3, 2022.
Office Action issued in corresponding Korean Patent Application No. 10-2021-7034174 dated Feb. 9, 2022, with English translation.
Communication pursuant to Article 94(3) EPC issued in corresponding European Patent Application No. 19 195 147.4 dated Apr. 1, 2022.
Notice of Allowance issued in corresponding U.S. Appl. No. 16/592,433 dated Sep. 3, 2020.
Office Action issued in corresponding U.S. Appl. No. 16/871,866 dated Oct. 9, 2020.
Office Action issued in corresponding Japanese Patent Application No. 2019-105062 dated Feb. 16, 2021 (drafted Feb. 4, 2021), with English translation.
Office Action issued in corresponding Indian Patent Application No. 201938021966 dated Feb. 25, 2021.
Notice for Decision to Reject issued in corresponding Korean Patent Application No. 10-2020-7007160 dated Apr. 19, 2021.
Office Action issued in corresponding Korean Patent Application No. 10-2020-7007160 dated Jul. 21, 2021.

(56) References Cited

OTHER PUBLICATIONS

Notice of Allowance issued in corresponding U.S. Appl. No. 16/848,297 dated Jul. 22, 2021.
Non-final Office Action issued in U.S. Appl. No. 16/871,919 dated Jun. 10, 2021.
Office Action dated Jul. 14, 2020 in Japanese Application 2019-105062.
Haitao Yang et al., Regional Disparity Based Motion and Disparity Prediction for MVC, Joint Video Team (JVT) of ISO/IEC MPEG & ITU-T VCEG(ISO/IEC JTC1/SC29/WG11 and ITU-T SG16 Q.6), 22nd Meeting: Marrakech, Morocco, Jan. 2007, JVT-V071R1, pp. 1-6.
Office Action dated Sep. 30, 2020 in European Application 20168600.3.
Office Action dated Jun. 1, 2020 in Korean Application 10-2020-7007160.
Bartnik et al., "HEVC Extension for Multiview Video Coding and Multiview Video plus Depth Coding"; ITU-Telecommunications Standardization Sector Study Group 16 Question 6, Document VCEG-AR13, Feb. 3-10, 2012, 42 pages.
Ekmekcioglu et al., "Content Adaptive Enhancement of Multi-View Depth Maps for Free Viewpoint Video", IEEE Journal of Selected Topics in Signal Processing, vol. 5, No. 2, Apr. 1, 2011, pp. 352-361.
ITU-T and ISO/IEC JTC 1, "Advanced Video Coding for Generic Audiovisual Services", Recommendation ITU-T H.264 and ISO/IEC 14496-10 (MPEG-4 AC), 2010.
Merkle et al., "3D Video Coding: An Overview of Present and Upcoming Standards", Visual Communications and Image Processing, Jul. 11, 2010, 7 pages, Huang Shan, An Hui, China.
Na, S. et al., "Multi-View Depth Video Coding using Depth View Synthesis", IEEE International Symposium on Circuits and Systems, May 18, 2008, pp. 1400-1403.
Office Action dated Feb. 25, 2016 in parallel European Patent Application No. 12784624.4, 4 pages.
Office Action dated Sep. 30, 2016 in U.S. Appl. No. 14/273,730.
Official Communication issued in corresponding International Application PCT/EP2012/072889, dated Mar. 19, 2013.
Official Communication issued in corresponding Korean Patent Application No. 10-2014-7015900 dated Jul. 29, 2016.
Official Communication issued in International Patent Application No. PCT/EP/2012/072299, dated May 21, 2013.
Schwarz et al., "Description of 3D Video Coding Technology Proposal by Fraunhofter HHI (HEVC compatible, configuration A)", ISO/IEC JTC1/SC29/WG11, MPEG2011/M22570, Nov. 2011, 46 pages, Geneva, Switzerland.
Schwarz, H. et al., "Overview of the Scalable Video Coding Extension of the H.264/AVC Standard", IEEE Transactions on Circuits and Systems for Video Technology, vol. 17, No. 9, pp. 1103-1120, Sep. 2007.
Seo et al., "Motion Information Sharing Mode for Depth Video Coding", IEEE, 3DTV-Conference: The True Vision-Capture, Transmission and Display of 3D Video, Jun. 7, 2010, pp. 1-4.
Shimizu, S. et al., "View Scalable Multiview Video Coding Using 3-D Warping With Depth Map", IEEE Transactions on Circuits and Systems for Video Technology, vol. 17, No. 11, Nov. 2007, pp. 1485-1495.
Stefanoski, N. et al., "Description of 3D Video Coding Technology Proposal by Disney Research Zurich and Fraunhofer HHI", Motion Picture Expert Group meeting, No. M22668, Nov. 22, 2011, 34 pages.
Tanimoto et al., "View Synthesis Algorithm in View Synthesis Reference Software 2.0 (VSRS2.0)", ISO/IEC JTC1/ SC29/WG11, MPEG 2008/M16090, Feb. 2009, 5 pages, Lausanne, Switzerland.
Vetro et al., "Overview of the Stereo and Multiview Video Coding Extensions of the H.264/MPEG-4 AVC Standard", Proceedings of the IEEE, vol. 99, No. 4, Apr. 11, 2011, pp. 626-642.
Vetro et al., "Joint Multiview Video Model (JMVM) 6.0", Joint Video Team (JVT) of ISO/IEC MPEG & ITU-T VCEG ISO/IEC JTC1/SC29/WG11 and ITU-T SG16 0.6, 25th Meeting, Document JVT-Y207, Oct. 2007, 10 pages, Shenzhen, China.
Zheng et al., "Affine Model for Disparity Estimation in Multiview Sequence Coding", International Conference on Information Theory and Information Security (ICITIS), Dec. 17, 2010, pp. 736-740, Nanning, China.
Office Action dated Dec. 27, 2016 in U.S. Appl. No. 14/277,850.
Office Action dated Feb. 17, 2017 in Chinese Application No. 2012800667391.
Office Action dated Mar. 15, 2017 in U.S. Appl. No. 14/272,671.
Office Action dated Oct. 20, 2017 in U.S. Appl. No. 14/273,730.
Office Action dated Oct. 3, 2017 in U.S. Appl. No. 14/277,850.
Office Action dated Nov. 23, 2017 in European Application 12784624.4.
Non-final Office Action U.S. Appl. No. 14/277,850 dated May 10, 2018.
Konieczny et al., "Depth-Based Interview Prediction of Motion Vectors for Improved Multiview Video Coding", 2010, IEEE. pp. 1-4.
Notice of Allowance U.S. Appl. No. 14/272,671 dated Jun. 4, 2018.
Non-final Office Action U.S. Appl. No. 14/273,730 dated Jun. 1, 2018.
Final Office Action U.S. Appl. No. 14/277,850 dated Dec. 10, 2018.
Summons to Attend Oral Hearing EP Application No. 1284624.4 dated Jan. 2, 2019.
Final Office Action U.S. Appl. No. 14/273,730 dated Jan. 28, 2019.
Non-final Office Action U.S. Appl. No. 16/120,731 dated Mar. 21, 2019.
Non-final Office Action U.S. Appl. No. 14/277,850 dated May 30, 2019.
Notice of Allowance U.S. Appl. No. 16/120,731 dated Jul. 3, 2019.
Non-final Office Action U.S. Appl. No. 14/273,730 dated Jun. 14, 2019.
Notice of Allowance Korean Patent Application No. 10-2018-7024889 dated Jul. 1, 2019.
Office Action dated Sep. 17, 2019 in Japanese Patent Application 2017-137033.
Office Action dated Dec. 11, 2019 in Korean Application 10-2019-7028653.
Notice of Allowance dated Jan. 14, 2020 in U.S. Appl. No. 14/277,850.
Office Action dated Jan. 7, 2020 in Japanese Application 2017-137033.
Notice of Allowance dated Feb. 11, 2020 in U.S. Appl. No. 14/273,730.
Office Action dated Apr. 23, 2020 in European Application 19195147.4.
Office Action dated Apr. 23, 2020 in European Application 19195133.4.
Notice of Allowance dated Sep. 20, 2021 in U.S. Appl. No. 16/871,919.
Tanimoto et al., "Multi-view Depth Map of Rena and Akko & Kayo", ISO/IEC JTC1/SC29/WG11 M14888, Oct. 2007, 5 pages, Shenzhen, China.
Notice of Allowance dated Sep. 3, 2020 in U.S. Appl. No. 16/859,433.
Office Action issued in corresponding Japanese Patent Application 2021-100230 dated Jul. 8, 2022, with English translation.
Office Action (Notice of Allowance) issued in corresponding Korean Patent Application No. 10-2021-7034174 dated Oct. 24, 2022, with English translation.
Appeal Decision issued in corresponding Japanese Patent Application No. 2019-105062 dated Dec. 13, 2022, with English translation.
Office Action issued in corresponding Chinese Patent Application 201910417853.8 dated Sep. 6, 2022.
Decision to Grant issued in corresponding Japanese Patent Application 2021-100230 dated Feb. 14, 2023, with English translation.
Communication pursuant to Article 94(3) EPC issued in corresponding European Application No. 20 168 600.3-1208 dated Feb. 13, 2023.
Office Action issued in corresponding U.S. Appl. No. 17/531,478 dated Feb. 2, 2023.
Notice of Issuance issued in corresponding Chinese Patent Application No. 201910417853.8 dated Apr. 15, 2023.

EFFICIENT MULTI-VIEW CODING USING DEPTH-MAP ESTIMATE FOR A DEPENDENT VIEW

CROSS-REFERENCE TO RELATED APPLICATIONS

The present application is a continuation of U.S. patent application Ser. No. 16/871,919, filed May 11, 2020, which is a continuation of U.S. patent application Ser. No. 14/273, 730 filed May 9, 2014, now U.S. Pat. No. 10,694,165, which is a continuation of International Application PCT/EP2012/072300, filed Nov. 9, 2012, which claims priority from U.S. Patent Application 61/558,660, filed Nov. 11, 2011, all of which are incorporated herein by reference in their entireties.

The present invention is concerned with multi-view coding in accordance with a multi-view codec such as codecs where a picture of a reference view and/or a picture of a dependent view has a depth-map associated therewith.

BACKGROUND OF THE INVENTION

In multi-view video coding, two or more views of a video scene (which are simultaneously captured by multiple cameras) are coded in a single bitstream. The primary goal of multi-view video coding is to provide the end user with an advanced multimedia experience by offering a 3-d viewing impression. If two views are coded, the two reconstructed video sequences can be displayed on a conventional stereo display (with glasses). However, the usage of glasses for conventional stereo displays is often annoying for the user. Enabling a high-quality stereo viewing impression without glasses is currently an important topic in research and development. A promising technique for such autostereoscopic displays is based on lenticular lens systems. In principle, an array of cylindrical lenses is mounted on a conventional display in a way that multiple views of a video scene are displayed at the same time. Each view is displayed in a small cone, so that each eye of the user sees a different image; this effect creates the stereo impression without special glasses. However, such autosteroscopic displays involve typically 10-30 views of the same video scene (even more views may be used if the technology is improved further). More than 2 views can also be used for providing the user with the possibility to interactively select the viewpoint for a video scene. But the coding of multiple views of a video scene drastically increases the bit rate that may be used in comparison to conventional single-view (2-d) video. Typically, the bit rate that may be used increases approximately linearly with the number of coded views. A concept for reducing the amount of transmitted data for autostereoscopic displays consists of transmitting only a small number of views (perhaps 2-5 views), but additionally transmitting so-called depth maps, which represent the depth (distance of the real world object to the camera) of the image samples for one or more views. Given a small number of coded views with corresponding depth maps, high-quality intermediate views (virtual views that lie between the coded views)—and to some extend also additional views to one or both ends of the camera array—can be created at the receiver side by a suitable rendering techniques.

For both stereo video coding and general multi-view video coding (with or without depth maps), it is important to exploit the interdependencies between the different views. Since all views represent the same video scene (from a slightly different perspective), there is a large amount of interdependencies between the multiple views. The goal for designing a highly efficient multi-view video coding system is to efficiently exploit these interdependencies. In conventional approaches for multi-view video coding, as for example in the multi-view video coding (MVC) extension of ITU-T Rec. H.264 I ISO/IEC 14496-10, the only technique that exploits view interdependencies is a disparity-compensated prediction of image samples from already coded views, which is conceptually similar to the motion-compensated prediction that is used in conventional 2-d video coding. However, typically only a small subset of image samples is predicted from already coded views, since the temporal motion-compensated prediction is often more effective (the similarity between two temporally successive images is larger than the similarity between neighboring views at the same time instant). In order to further improve the effectiveness of multi-view video coding, it is useful to combine the efficient motion-compensated prediction with inter-view prediction techniques. One possibility is to re-use the motion data that are coded in one view for predicting the motion data of other views. Since all views represent the same video scene, the motion in one view is connected to the motion in other views based on the geometry of the real-world scene, which can be represented by depth maps and some camera parameters.

In state-of-the-art image and video coding, the pictures or particular sets of sample arrays for the pictures are usually decomposed into blocks, which are associated with particular coding parameters. The pictures usually consist of multiple sample arrays (luminance and chrominance). In addition, a picture may also be associated with additional auxiliary samples arrays, which may, for example, specify transparency information or depth maps. Each picture or sample array is usually decomposed into blocks. The blocks (or the corresponding blocks of sample arrays) are predicted by either inter-picture prediction or intra-picture prediction. The blocks can have different sizes and can be either quadratic or rectangular. The partitioning of a picture into blocks can be either fixed by the syntax, or it can be (at least partly) signaled inside the bitstream. Often syntax elements are transmitted that signal the subdivision for blocks of predefined sizes. Such syntax elements may specify whether and how a block is subdivided into smaller blocks and being associated coding parameters, e.g. for the purpose of prediction. For all samples of a block (or the corresponding blocks of sample arrays) the decoding of the associated coding parameters is specified in a certain way. In the example, all samples in a block are predicted using the same set of prediction parameters, such as reference indices (identifying a reference picture in the set of already coded pictures), motion parameters (specifying a measure for the movement of a blocks between a reference picture and the current picture), parameters for specifying the interpolation filter, intra prediction modes, etc. The motion parameters can be represented by displacement vectors with a horizontal and vertical component or by higher order motion parameters such as affine motion parameters consisting of six components. It is also possible that more than one set of particular prediction parameters (such as reference indices and motion parameters) are associated with a single block. In that case, for each set of these particular prediction parameters, a single intermediate prediction signal for the block (or the corresponding blocks of sample arrays) is generated, and the final prediction signal is built by a combination including superimposing the intermediate prediction signals. The corresponding weighting parameters and potentially also a constant offset (which is added to the weighted sum) can either be fixed for a picture, or a reference picture, or a set of reference pictures, or they can be included in the set of prediction parameters for the corresponding block. The difference between the original blocks (or the corresponding blocks of sample arrays) and their prediction signals, also referred to as the residual signal, is usually transformed and quantized. Often, a two-dimensional transform is applied to the residual signal (or the corresponding sample arrays for the residual block). For transform coding, the blocks (or the corresponding blocks of sample arrays), for which a particular set of prediction parameters has been used, can be further split before applying the transform. The transform blocks can be equal to or smaller than the blocks that are used for prediction. It is also possible that a transform block includes more than one of the blocks that are used for prediction. Different transform blocks can have different sizes and the transform blocks can represent quadratic or rectangular blocks. After transform, the resulting transform coefficients are quantized and so-called transform coefficient levels are obtained. The transform coefficient levels as well as the prediction parameters and, if present, the subdivision information is entropy coded.

The state-of-the-art in multi-view video coding extends the 2-d video coding techniques in a straightforward way. Conceptually, two or more video sequences, which correspond to the different views, are coded (or decoded) in parallel. Or more specifically, for each access unit (or time instant), the pictures corresponding to the different views are coded in a given view order. An MVC bitstream contains a base view, which can be decoded without any reference to other views. This ensures backwards compatibility with the underlying 2-d video coding standard/scheme. The bitstream is usually constructed in a way that the sub-bitstream corresponding to the base view (and in addition sub-bitstreams corresponding to particular subsets of the coded views) can be extracted in a simple way by discarding some packets of the entire bitstream. In order to exploit dependencies between views, pictures of already coded views of the current access unit can be used for the prediction of blocks of the current view. This prediction is often referred to as disparity-compensated prediction or inter-view prediction. It is basically identical to the motion-compensated prediction in conventional 2-d video coding; the only difference is that the reference picture represents a picture of a different view inside the current access unit (i.e., at the same time instant) and not a picture of the same view at a different time instant. For incorporating inter-view prediction in the design of the underlying 2-d video coding scheme, for each picture, one or more reference picture lists are constructed. For the base view (independently decodable view), only conventional temporal reference pictures are inserted into the reference picture lists. However, for all other views, inter-view reference pictures can be inserted into a reference picture list in addition (or instead of) temporal reference pictures. Which pictures are inserted into a reference picture list determined by the video coding standard/scheme and/or signaled inside the bitstream (e.g., in a parameter set and/or slice header). Whether a temporal or inter-view reference picture is chosen for a particular block of the current view is then signaled by coding (or inferring) a reference picture index. I.e., the inter-view reference pictures are used in exactly the same way as conventional temporal reference pictures; only the construction of the reference picture lists of slightly extended.

The current state-of-the-art in multi-view video coding is the Multi-view Video Coding (MVC) extension of ITU-T Rec. H.2641 ISO/IEC JTC 1 [1][2]. MVC is a straightforward extension of ITU-T Rec. H.264 I ISO/IEC JTC 1 towards multi-view video coding. Beside some extensions of the high level syntax, the only tool that has been added is the disparity-compensated prediction as described above. However, it should be noted that disparity-compensated prediction is typically only used for a small percentage of block. Except for regions that are covered or uncovered due to the motion inside a scene, the temporal motion-compensated prediction typically provides a better prediction signal than the disparity-compensated prediction, in particular if the temporal distance between the current and the reference picture is small. The overall coding efficiency could be improved if the temporal motion-compensated prediction could be combined with suitable inter-view prediction techniques. There is a conceptually similar problem in scalable video coding, where two representations of the same video sequence with different resolutions or fidelities are coded in a single bitstream. For the enhancement layer, there are in principle two possibilities to prediction a block of samples (if we ignore spatial intra prediction), using a temporal motion-compensated prediction from an already coded enhancement layer picture or an inter-layer prediction from the lower layer. In Scalable Video Coding (SVC) extension [3], the conventional temporal motion-compensated prediction has been combined with an inter-layer prediction of motion parameters. For an enhancement layer block, it provides the possibility to reuse the motion data of the co-located base layer block, but apply it to the enhancement layer (i.e., use the enhancement layer reference picture with base layer motion data). In this way, the temporal motion-compensated prediction inside a layer is efficiently combined with an inter-layer prediction of motion data. The general idea behind this technique is that all layers in a scalable bitstream show the same content, and hence also the motion inside each layer is the same. It does not necessarily mean that the best motion parameters for one layer are also the best motion parameters for a following layer due to the following effects: (1) The quantization of the reference pictures modifies the sample values and since different layers are quantized differently, the motion parameters that give the smallest distortion can be different for different layers; (2) Since the layers are coded at different bit rates, a particular set of motion parameters usually corresponds to a different trade-off between rate and distortion. And in rate-distortion optimized coding (which is for example achieved by minimizing of the Lagrangian functional 2>–f 1 £ of the distortion ˆ and the associated rate ˆ), different motion parameters can be optimal in rate-distortion sense for different layers (the operating point given by as well as the associated distortion or rate can be different). Nonetheless, the (optimal) motion parameters in base and enhancement layer are usually similar. And it is typically very likely that a mode the re-uses the motion parameters of the base layer (and is therefore associated with a small rate ˆ) leads to a smaller overall cost (£>+>: £) than the optimal mode that is independent of the base layer. Or in other words, it is likely that the distortion increase that is associated by choosing the mode with base layer motion data instead of the mode with optimal enhancement motion data is smaller than the cost that is associated with the decrease in rate (AS: T<0}.

Conceptually, a similar concept as for SVC can also be used in multi-view video coding. The multiple cameras capture the same video scene from different perspective. However, if a real world object moves in the scene, the motion parameters in different captured views are not independent. But in contrast to scalable coding, where the position of an object is the same in all layers (a layer represent just a different resolution or a different quality of the same captured video), the interrelationship of the projected motion is more complicated and depends on several camera parameters as well as on the 3-d relationships in the real-world scene. But if all relevant camera parameters (such as focal length, distance of the cameras, and direction of the optical axis of the cameras) as well as the distance of the projected object points (depth map) are given, the motion inside a particular view can be derived based on the motion of another view. In general, for coding a video sequence or view, we don't need to know the exact motion of the object points; instead simple parameters such as motion vectors for blocks of samples are sufficient. In this spirit, also the relationship of the motion parameters between different views can be simplified to some extent.

However, favorably, the coding order in coding a multi-view signal is chosen such that the pictures conveying the texture of the respective view are coded prior to the corresponding depth map so as to be able to efficiently exploit characteristics known from coding/decoding the picture in coding/decoding the depth map. In even other words, the removal of redundancy between a depth map and the associated picture turns out to be more effective in case of a coding order which leads from the picture to the depth map rather than vice versa. Obeying this coding order, however, results in a lack of available depth map information at the decoding side at the time the decoder decodes the picture of a dependent view, since its depth map has not yet been reconstructed. Disadvantageously, coding parameters of the reference view may not be exploited efficiently.

SUMMARY

According to an embodiment, an apparatus for reconstructing a multi-view signal coded into a multi-view data stream may have a dependent-view reconstructor configured to derive, for at least one of blocks of a current picture in a dependent view of the multi-view signal, a list of motion vector predictor candidates by determining a disparity vector for the at least one block representing a disparity between the current picture of the dependent view and a current picture of a reference view of the multi-view signal at the at least one block of the current picture of the dependent view, via a depth map explicitly signaled within the multi-view signal in addition to motion and/disparity vectors for a picture to which the depth map belongs; determining a block within the current picture of the reference view using the determined disparity vector; adding a motion vector to the list of motion vector predictor candidates which depends on a motion vector associated with the determined block of the current picture of the reference view; and extract, for the at least one block of the current picture of the dependent view, index information specifying one motion vector predictor candidate of the list of motion vector predictor candidates, from the multi-view data stream; and reconstruct the at least one block of the current picture of the dependent view by performing a motion-compensated prediction of the at least one block of the current picture of the dependent view using a motion vector which depends on the specified motion vector candidate.

According to another embodiment, an apparatus for encoding a multi-view signal into a multi-view data stream may have a dependent-view reconstructor configured to derive, for at least one of blocks of a current picture in a dependent view of the multi-view signal, a list of motion vector predictor candidates by determining a disparity vector for the at least one block representing a disparity between the current picture of the dependent view and a current picture of a reference view of the multi-view signal at the current picture of the dependent view, via a depth map explicitly signaled within the multi-view signal in addition to motion and/disparity vectors for a picture to which the depth map belongs; determining a block within the current picture of the reference view using the determined disparity vector; adding a motion vector to the list of motion vector predictor candidates which depends on a motion vector associated with the determined block of the picture of the reference view; and insert, for the at least one block of the current picture of the dependent view, index information specifying one motion vector predictor candidate of the list of motion vector predictor candidates, into the multi-view data stream; and encode the at least one block of the current picture of the dependent view by performing a motion-compensated prediction of the at least one block of the current picture of the dependent view using a motion vector which depends on the specified motion vector candidate.

According to another embodiment, an apparatus for reconstructing a multi-view signal coded into a multi-view data stream may have: a reference-view reconstructor configured to reconstruct a depth map of a current picture of a reference view of the multi-view signal from a reference view depth-map portion of the multi-view data stream; a depth estimator configured to estimate a depth map of a current picture of a dependent view by warping the depth map of the current picture of the reference view into the dependent view; and a dependent-view reconstructor configured to reconstruct the current picture of the dependent view from a dependent view portion of the multi-view data stream using the depth map estimate of the current picture of the dependent view.

According to another embodiment, an apparatus for encoding a multi-view signal into a multi-view data stream may have: a reference-view encoder configured to encode a depth map of a current picture of a reference view of the multi-view signal into a reference view depth-map portion of the multi-view data stream; a depth estimator configured to estimate a depth map of a current picture of a dependent view by warping a reconstructed depth map of the current picture of the reference view as encoded into reference view depth-map portion of the multi-view data stream, into the dependent view; and a dependent-view encoder configured to encode the current picture of the dependent view into a dependent view portion of the multi-view data stream using the depth map estimate of the current picture of the dependent view.

According to another embodiment, a method for reconstructing a multi-view signal coded into a multi-view data stream may have the steps of: deriving, for at least one of blocks of a current picture in a dependent view of the multi-view signal, a list of motion vector predictor candidates by determining a disparity vector for the at least one block representing a disparity between the current picture of the dependent view and a current picture of a reference view of the multi-view signal at the at least one block of the current picture of the dependent view, via a depth map explicitly signaled within the multi-view signal in addition to motion and/disparity vectors for a picture to which the depth map belongs; determining a block within the current picture of the reference view using the determined disparity vector; adding a motion vector to the list of motion vector predictor candidates which depends on a motion vector associated with the determined block of the current picture of the reference view; and extracting, for the at least one block of the current picture of the dependent view, index information specifying one motion vector predictor candidate of the list of motion vector predictor candidates, from the multi-view data stream; and reconstructing the at least one block of the current picture of the dependent view by performing a motion-compensated prediction of the at least one block of the current picture of the dependent view using a motion vector which depends on the specified motion vector candidate.

According to another embodiment, a method for encoding a multi-view signal into a multi-view data stream may have the steps of: deriving, for at least one of blocks of a current picture in a dependent view of the multi-view signal, a list of motion vector predictor candidates by determining a disparity vector for the at least one block representing a disparity between the current picture of the dependent view and a current picture of a reference view of the multi-view signal at the current picture of the dependent view, via a depth map explicitly signaled within the multi-view signal in addition to motion and/disparity vectors for a picture to which the depth map belongs; determining a block within the current picture of the reference view using the determined disparity vector; adding a motion vector to the list of motion vector predictor candidates which depends on a motion vector associated with the determined block of the picture of the reference view; and inserting, for the at least one block of the current picture of the dependent view, index information specifying one motion vector predictor candidate of the list of motion vector predictor candidates, into the multi-view data stream; and encoding the at least one block of the current picture of the dependent view by performing a motion-compensated prediction of the at least one block of the current picture of the dependent view using a motion vector which depends on the specified motion vector candidate.

According to another embodiment, a method for reconstructing a multi-view signal coded into a multi-view data stream may have the steps of: reconstructing a depth map of a current picture of a reference view of the multi-view signal from a reference view depth-map portion of the multi-view data stream; estimating a depth map of a current picture of a dependent view by warping the depth map of the current picture of the reference view into the dependent view; and reconstructing the current picture of the dependent view from a dependent view portion of the multi-view data stream using the depth map estimate of the current picture of the dependent view.

According to another embodiment, a method for encoding a multi-view signal into a multi-view data stream may have the steps of: encoding a depth map of a current picture of a reference view of the multi-view signal into a reference view depth-map portion of the multi-view data stream; estimating a depth map of a current picture of a dependent view by warping a reconstructed depth map of the current picture of the reference view as encoded into reference view depth-map portion of the multi-view data stream, into the dependent view; and encoding the current picture of the dependent view into a dependent view portion of the multi-view data stream using the depth map estimate of the current picture of the dependent view.

According to another embodiment, a computer program may have a program code for performing, when running on a computer, a method according to claim 16.

According to another embodiment, a computer program may have program code for performing, when running on a computer, a method according to claim 18.

In accordance with a first aspect of the present invention, an idea is exploited according to which maintaining the usual coding order according to which the reference view is coded prior to the dependent view, and within each view, a depth map is coded subsequent to the respective picture, does not have to lead to a sacrifice of efficiency in performing inter-view redundancy removal by, for example, predicting motion data of the current picture of the dependent view from motion data of the current picture of the reference view. Rather, a depth map estimate of the current picture of the dependent view may be obtained by warping the depth map of the current picture of the reference view into the dependent view, thereby enabling various measures of inter-view redundancy reduction more efficiently by bridging the gap between the views.

According to another aspect, the following discovery is exploited: the overhead associated with an enlarged list of motion predictor candidates for a block of a picture of a dependent view is comparatively low compared to a gain in motion vector prediction quality resulting from an adding of a motion vector candidate which is determined from an, in disparity-compensated sense, co-located block of a reference view. The disparity between both blocks may or may not be determined using the first aspect.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
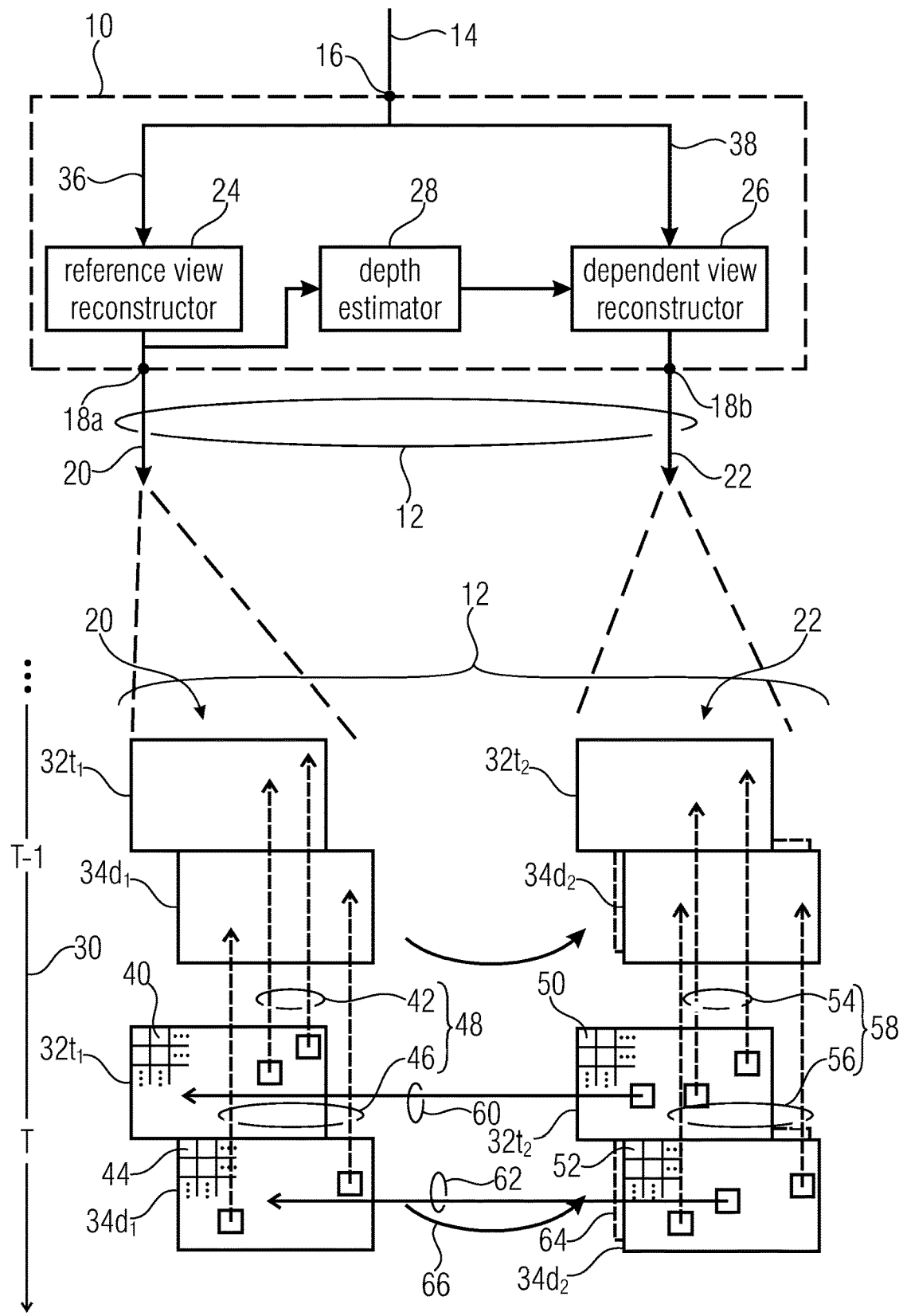
FIG. 1 shows a block diagram of an apparatus for reconstruction of a multi-view signal in accordance with an embodiment.

FIG. 1 shows an embodiment for an apparatus 10 for reconstructing a multi-view signal 12 coded into a multi-view data stream 14. The apparatus 10 comprises an input 16 for the multi-view data stream 14, and two outputs 18a and 18b for a reference view signal 20 and a dependent view signal 22, respectively.

Further, apparatus 10 comprises a reference view reconstructor 24 connected between input 16 and output 18a and a dependent view reconstructor 26 connected between input 16 and output 18b. A depth map estimator 28 of apparatus 10 is connected between an output of reference view reconstructor 24 and a reference input of dependent view reconstructor 26.

As will be outlined in more detail below, the apparatus or decoder 10 of FIG. 1 reconstructs the multi-view signal 12 from the multi-view data stream 14 by obeying a coding/decoding order according to which the reference view signal 20 is processed prior to dependent view 22. The multi-view signal 12 may, as shown in FIG. 1, not only represent a spatial sampling of one common scene from different view directions or view points associated with respective views 20 and 22, but also a temporal sampling of this scene as it is illustrated in FIG. 1 exemplarily by showing two time instants T and T−1 along a time axis 30. For each time instant, each view 20 and 22 comprises a picture $32t_1$ and $32t_2$, wherein each picture $32{1,2}$ comprises a respective depth map $34d_1$ and $34d_2$. As known in the art, the additional information spent by these depth maps $34d_{1,2}$ may be used by an intermediate-view synthesizer downstream to output 18a and 18b, respectively, in order to synthesize intermediate views between views 20 and 22 from the pictures $32t_{1,2}$.

It is noted that FIG. 1 assumes that each picture $32t_{1,2}$ comprises a respective depth map $34d_{1,2}$, but this does not need to be the case. The advantages of the embodiments of the present invention may also be exploited when the temporal resolution of the depth map $34d_{1,2}$ differs from the associated sequence of pictures $32t_{1,2}$. Moreover, even the time resolution between view 20 and view 22 may differ. Naturally, the same applies to the spatial resolution of the pictures and depth maps. Depth map resolution and picture resolution may differ from each other and the same applies to the spatial resolution when comparing view 20 to view 22. Further, it is noted that the term "picture" has been used herein in two meanings, namely firstly to denote the conglomeration of all spatially sampled information of a respective view for a current time instance, such as texture and depth map, and merely the texture at the current time instance. The context will reveal as to which meaning is respectively meant.

Moreover, decoder 10 is configured to process the multi-view signal 12 sequentially in time. To be more precise, decoder 10 is configured to reconstruct the pictures $32t_{1,2}$ and the respective depth maps $34d_{1,2}$ of a certain time instance, such as T−1, prior to continuing with processing the pictures and depth maps of another time instance T. In this regard, it is noted that the temporal coding order among the time instances of the multi-view signal 12 may be equal to the presentation time order of the pictures and depth maps, respectively, or may differ therefrom.

The reference view reconstructor 24 is configured to reconstruct the reference view 20 from a reference view portion 36 of the multi-view data stream 14, while the dependent view reconstructor 26 is configured to reconstruct the dependent view 22 based on a dependent view portion 38 of the multi-view data stream 14. In fact, reference view reconstructor 24 and dependent view reconstructor 26 may be configured to operate in a similar manner. For example, reference reconstructor 24 and dependent view reconstructor 26 may operate on a block-wise basis. Both may, for example, be configured as a hybrid video decoder, respectively. The reference view reconstructor 24 reconstructs, for example, the picture 34t1 of a current time instant T by assigning a respective one of available coding modes to the blocks 40 into which this picture is subdivided. The subdivision of picture 34t1 into blocks may be predefined by default or may be signaled within the multi-view data stream 14. The subdivision may subdivide picture 34t1 in a regular manner into blocks of the same size or blocks of different size. Even further, a multi-tree subdivisioning may be possible so that the block size of blocks 40 may be locally adapted to the picture content. The coding modes available may comprise one or more intra prediction modes according to which reference view reconstructor 24 fills the respective block 40 by prediction from already reconstructed samples of already reconstructed blocks preceding the current block in a decoding order defined among the blocks of picture 34t1, and/or one or more inter prediction modes according to which reference view reconstructor 24 reconstructs the respective block by motion compensated prediction using motion data such as motion vectors, reference picture indices and the like. For example, for illustration purposes two blocks are exemplarily shown to be reconstructed by inter prediction. The motion data 42 for these inter-predicted blocks may comprise motion vectors used by reference view reconstructor 24 to copy respective portions of a reconstructed version of a reference picture 34t1 indexed by a reference index also comprised by the motion data 42. The motion data 42 is comprised by the reference view portion 36 of multi-view data stream 14.

Reference view reconstructor 24 is, however, also responsible for reconstructing the depth map $34d_1$ of the current picture $34t_1$ of the current time instance T of the reference view 20 from a reference view depth map portion of portion 36. As illustrated in FIG. 1, reference view reconstructor 24 may also use a block-wise processing in order to reconstruct the depth map $34d_1$. The subdivision of depth map $34d_1$ may be spatially adopted from the subdivision of the corresponding picture $34t_1$, or subdivision information may be contained in multi-view data stream 14 with regard to depth map $34d_1$. The coding modes which reference view reconstructor 24 supports for the blocks 44 of depth map $34d_1$ may or may not comprise the coding modes available for blocks 40 of picture 34t1. Additionally, however, other coding modes may be available as well. For example, some blocks of depth map $34d_1$ may be predicted from already reconstructed portions 40 of picture $34t_1$ of the same time instance. It should be noted that even the coding modes assigned to blocks 44 may be adopted by reference view reconstructor 24 from the coding modes of co-located blocks 40 of picture $34t_1$. Otherwise, the coding modes for blocks 44 and 40 are conveyed within the multi-view data stream 14. For illustration purposes, two blocks of blocks 44 of depth map $34d_1$ are exemplarily shown to be inter predicted using motion data 46, by copying from corresponding portions of a referenced, already reconstructed depth map $34d_1$ indexed, for example, by reference index which may also be comprised by the motion data 46 optionally.

Similarly to the coding modes, motion data 46 may be adopted for motion data 42, or at least predicted therefrom. Together, motion data 42 and motion data 46 represent motion data 48 of the current picture or time instant view 20.

The dependent view reconstructor 26 operates quite the same as reference view reconstructor 24 with dependent view reconstructor 26, however, being configured to reconstruct the dependent view 22 from the dependent view portion 38. Accordingly, in reconstructing a current picture 32t2 of current time instant T, dependent view reconstructor 26 may also use a block-wise processing using a subdivision into blocks 50 which may be fixed or signaled within multi-view data stream 14. Alternatively, depth map based inter-view prediction of the subdivision into blocks 50 as outlined in more detail below may be used by dependent view reconstructor 26 so as to derive the subdivision into blocks 50 for view 22 from the subdivision into blocks 40 and/or blocks 44 of view 20. Dependent view reconstructor 26 may also use such a subdivisioning into blocks 52 for depth map $34d_2$ of view 22. As far as the coding modes are concerned, dependent view reconstructor 26 may support coding modes as they have been described with respect to the reference view reconstructor 24. Accordingly, illustratively, two blocks 50 and two blocks 52 are exemplarily shown to be subject to inter prediction using motion data 54 and 56, respectively, so as to be appropriately copied from respective portions of a reconstructed version of previously reconstructed pictures 32t2 and the respective depth map $34d_2$, respectively. Together, this motion data 58 represents the motion data for the current picture or current time instance of view 22. In addition to these coding modes, however, dependent view reconstructor 26 has the ability to support one or more inter-view prediction modes for using disparity-compensated prediction in order to copy respective blocks from portions of view 20 of the same time instance, but spatially displaced, as defined by some disparity data. In FIG. 1, one disparity predicted block in picture 32t2 and the depth map $34d_2$ are exemplarily shown along with the corresponding disparity data 60 and 62. Disparity data may, for example, comprise a disparity vector or at least a disparity component along the view offset direction between views 20 and 22, and optionally a view index indicating the reference view from which the respective block of the dependent view 22 depends, which index may be favorable in case of the coexistence of more than two views as exemplarily shown in FIG. 1. Together, disparity data 60 and 62 form the disparity data for the current picture or current time instance T of view 22.

That is, reference view reconstructor 24 and dependent view reconstructor 26 operate in a manner so as to reduce the redundancies between a picture and its depth map, along the time axis 30 and in inter-view direction, between views 20 and 22, as far as possible. This is also true, for example, for the prediction of the side information such as the motion data and disparity data as well as the coding modes and the subdivision information mentioned above. All of this information shows redundancies among each other in time direction, between the views and between a picture and its depth map.

However, the dependent view reconstructor 26 could more efficiently exploit the redundancy between views 20 and 22 if the dependent view reconstructor 26 had access to the depth map $34d_2$ prior to decoding picture $32t_2$ of the same time instance. Accordingly, the depth estimator 28 is configured to provide a depth map estimate 64 as an estimate for the depth map $34d_2$ of the current picture $32t_2$ of the current time instant T in the manner described in more detail below, and the dependent view reconstructor 26 is configured to reconstruct the current picture 32t2 of the current time instant of the dependent view 22 from the dependent view portion 38 of the multi-view data stream 14 using this depth map estimate 64. For example, having the depth map estimate at hand, the dependent view reconstructor 26 is able to predict the motion data 58 of the current picture (including its depth map $34d_2$) of the dependent view 22 based on the depth map estimate 64 of the current view 22 and the motion data 48 for the current picture of the reference view 20 and reconstruct the current picture (including its depth map) of the dependent view 22 using motion compensated prediction based on the predicted motion data. For example, the current-view reconstructor 24 may be configured to, in predicting the motion data 58, use the depth data estimate 64 of the dependent view 22 to locate corresponding positions in the current picture of the reference view 20 and use the motion data for the current picture of the reference view 20 at the corresponding positions to predict the motion data 58 of the current picture of the dependent view 22. In the following description, a possible way how the spatial look-up using the depth data estimate 64 is done is described in more detail below. In particular, in the following description, the fact that the motion data 48 forms a good predictor for the motion data 58 is motivated in more detail. Naturally, refinement data in order to signal a prediction residual for the motion data 58 may be comprised by the dependent view portion 38. In particular, as will be set out in more detail below, dependent view reconstructor 26 may be configured to apply disparity vectors derived from the depth data estimate 64 for one or more predetermined sample positions within a current block 50 of picture 32t2 of the current time instant of dependent view 22 and use these disparity vectors in order to locate corresponding or warped positions in picture $34t_1$ of the same time instant of view 20 with using the motion data of the one or more blocks 40 containing the one or more warped positions as a predictor for the motion data of the current block 50. In case of more than one such reference sample position within the current block 50, the mean or median value of the resulting one or more reference motion data of the targeted block or blocks 40 may be used as the predictor. As the picture 32t2 is coded prior to its depth map $34d_2$ of dependent view 22, it is especially worthwhile for dependent reconstructor 26 to perform the just-outlined description for the blocks 50 within the picture 32t2. For the blocks 52, motion data prediction from the motion data 54 of the corresponding picture 32t2 is available anyway. In addition, spatial prediction, such as by using the merge concept among blocks 52 or some skip/direct mode, of motion data 54 is feasible.

Further, the dependent view reconstructor 26 could be configured to predict the disparity data 60 for the current picture of the dependent view 22 based on the depth data estimate 64 of the dependent view 22 and reconstruct the current picture of the dependent view 22 using disparity compensated prediction based on the predicted current disparity data. Again, refinement may be signaled within dependent view portion 38 of the multi-view data stream 14 and used by dependent view reconstructor 26 to refine the predicted current disparity data. Further, as outlined above, theoretically the disparity data 60 and 62 of blocks 50 and 52 could be predicted too in the same way. As will be outlined in more detail below, the dependent view reconstructor 26 could be configured to predict the disparity data 60 and 62 based on the depth data estimate 64 of the current view by converting the depth data into disparity vectors and using these disparity vectors as a predictor for the disparity vectors within the disparity data 60 and 62, respectively, directly.

Alternatively, the dependent view reconstructor 26 could be configured to reconstruct the depth map $34d_2$ of the current time instant of the dependent view 22 from a dependent view depth map portion of the dependent view portion 38 of the multi-view data stream 14 using the depth map estimate 64 as a prediction reference. For example, the dependent view reconstructor 26 could directly use the co-located portion of the depth map estimate 64 as a prediction of the content of a current block 52 of the depth map $34d_2$—i.e. copy the co-located portion—with merely applying a residual signal signaled within the dependent view portion 38 onto this predicted content so as to reconstruct the current portion 52.

Naturally, dependent view reconstructor 26 could support any combination of the just-mentioned possibilities so as to use the depth data estimate so as to reduce the inter-view redundancy between views 20 and 22.

In order to derive the just-mentioned depth data estimate, the depth estimator 28 acts as follows.

In particular, in accordance with the embodiment of FIG. 1, the depth estimator 28 is configured to estimate the depth map $34d_2$ of the current time instant T of dependent view 22 by warping 66 the depth map $34d_1$ of the current time instant T of the reference view 20 into the dependent view 22. For example, the depth estimator 28 may be configured to, in warping 66 the depth $34d_1$ of the reference view 20 into the dependent view 22, derive disparity vectors of the current time instant T of the reference view 20 from the depth map $34d_1$ of the current time instant T of the reference view 20 and apply the derived disparity vectors onto the depth map $34d_1$ of the current time instant of the reference view 20 itself so as to obtain the depth map estimate 64. Details regarding this are described further below.

Figure 2:
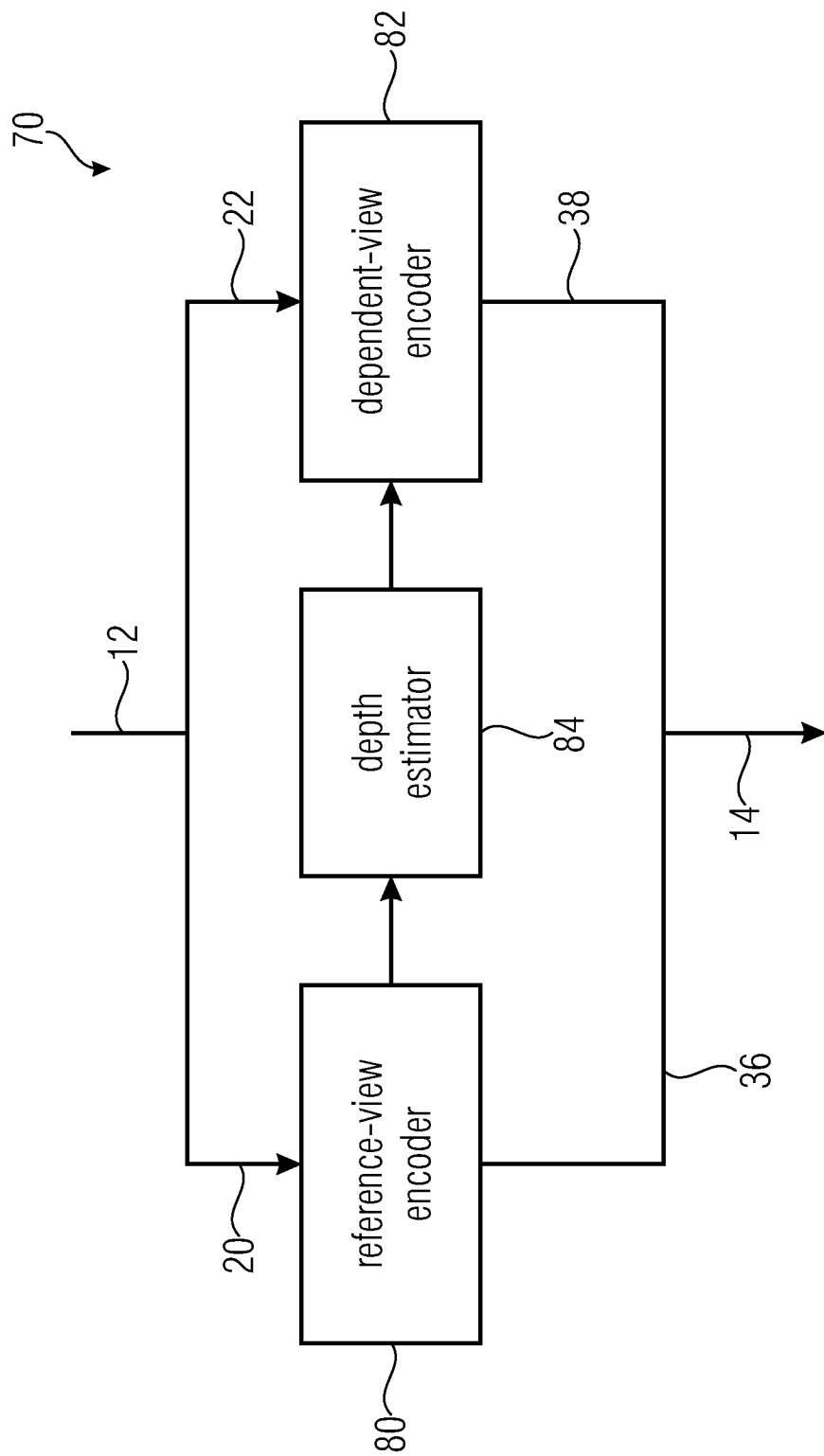
FIG. 2 shows a block diagram of an apparatus for encoding a multi-view signal fitting to the apparatus of FIG. 1 in accordance with an embodiment.

Before describing further details regarding the concepts outlined above, an embodiment for an encoder fitting to the decoder of FIG. 1 is described with respect to FIG. 2. FIG. 2 shows an apparatus for encoding the multi-view signal 12 into the multi-view data stream 14 and comprises, to this end, a reference view encoder 80, a dependent view encoder 82 and a depth estimator 84 with the encoder generally indicated with reference sign 90. The reference view encoder 80 is configured to encode the reference view 20 of the multi-view signal 12 into the reference view portion 36 of the data stream 14, while dependent view encoder 82 is responsible for encoding the dependent view 22 of multi-view signal 12 into the dependent view portion 38 of the multi-view data stream 14. Reference view encoder 80 and dependent view encoder 82 may operate in a backward predictive manner and a depth estimator 84 may be configured to estimate the depth map of a current picture or current time instant of the dependent view 22 by warping a reconstructed depth map $34d_1$ of a current picture or time instant of the reference view 20 as encoded into the reference view portion of the multi-view data stream 14, into the dependent view 22. To this end, reference view encoder 80 and dependent view encoder 82 may be parallely connected between an input and an output of encoder 90, while depth estimator 84 may be connected between a reconstruction output of reference view encoder 80 and a reference input of dependent view encoder 82. The reconstruction output of reference view encoder 80 may be connected to an internal prediction loop of reference view encoder 80 such as an output of an internal decoded picture buffer thereof.

Thus, when the reference view encoder 80 encodes a depth map $34d_1$ of a current time instant of reference view 20 of the multi-view signal 12, the depth estimator is able to derive a depth map estimate 64 for view 22 therefrom, and the dependent-view encoder may encode the current picture or current time instant of the dependent view 22 using the depth map estimate 64 in the manner outlined above with respect to FIG. 1, namely for predicting motion data 58 or at least 54, predicting disparity data 60 and 62 or at least 60, and predicting the depth map $34d_2$ directly, or at least a part of these options, and with or without generating prediction residual data for the respective motion or disparity data or depth map blocks, so as to form a part of the dependent view portion 38.

In the following, more detailed embodiments are presented, which are especially advantageous when combined with hybrid coding types using block merging, multi-tree block partitioning of regularly arranged tree-root blocks such as in HEVC.

The state-of-the art concepts for employing motion data of a reference view for efficiently coding a further view have all been developed based on the MVC extension of ITU-T Rec. H.264 IISO/IEC 14496-10. The new video coding standardization project of the ITU-T and ISO/IEC JTC 1/WG 11, which is also referred to as HEVC, shows very promising improvements in conventional 2-d video coding technology. The current working draft of HEVC provides substantial coding gains compared to ITU-T Rec. H.264 I ISO/IEC 14496-10. For achieving these gains several concepts have been extended in comparison to ITU-T Rec. H.264 I ISO/IEC 14496-10. The main improvements in the area of motion parameter coding and motion-compensated prediction include the following:

While the blocks sizes that are used for motion-compensated prediction in ITU-T Rec. H.264 I ISO/IEC 14496-10 range from 4×4 to 16×16 luma samples, a much larger variety of blocks sizes is supported in HEVC, which ranges from 4×4 to 64×64 luma samples. In addition, the basic coding units are not given by fixed macroblock and sub-macroblocks, but are adaptively chosen. The largest coding unit is typically a block of 64×64 luma samples, but the largest block size can actually be signaled inside the bitstream. The splitting of a block into subblock can establish a subdivision hierarchy of 4 or more levels.

Motion vectors are not coded by using a fixed motion vector predictor. Instead there exists a list of motion vector predictor candidates, and one of these predictors is adaptively chosen on a block basis. The chosen predictor is signaled inside the bitstream.

ITU-T Rec. H.264 I ISO/IEC 14496-10 provides the SKIP and DIRECT for which the motion parameters (number of hypothesis, reference indices, motion vectors) are completely derived from already coded information, without coding any additional parameters (except residual information). HEVC provides a so-called merge mode. For this mode a list of motion parameter candidates given by the motion parameters of spatially and temporally neighboring blocks is established. The motion parameters (including the number of hypothesis, reference indices, and motion vectors) that are chosen for a block coded in the merge mode are signaled by transmitting an index into the candidate list.

The following description will describe a concept for employing the motion data of already coded views as well as the disparity data for already coded pictures of a current view for coding a current picture of the current view in multiview video coding, with this concept representing a possible implementation of the embodiment described above. Further, the advantages resulting from the above and following embodiments will be explained in more detail. By employing the already coded motion and disparity information for predicting the temporal motion (or the disparity) of the current view, the motion data rate for the current view can be significantly reduced, which results in an overall bit rate saving for the coding of multiview video sequences. The described concept provides the possibility to directly derive all motion data for a block (or a general set of samples), in which case no further motion information are transmitted for a block. And it also provides the possibility to derive a motion vector predictor that is added to a list of candidate motion vector predictors. For the latter possibility, an index into the list of motion vector predictors as well as a motion vector difference are transmitted for a block, which specify the final motion vector used for motion-compensated prediction. In a particular embodiment of the invention, not only the motion parameters for a block, but also the partitioning information for the block (which can split the block into smaller blocks and assign separate motion parameters to each sub-block) can be derived based on the already coded motion and disparity information. The concept is applicable to general block-based hybrid coding approaches without assuming any particular macroblock or sub-macroblock structure. The general block-based motion compensation is not modified, but only the coding of motion parameters, so that the concept can be integrated in general block-based hybrid video coding schemes with a very small complexity increase. It can also be straightforwardly extended to more general concepts, in which not rectangular blocks but other sets of samples are associated for unique motion parameters. The concept is applicable to multiview coding with additional depth maps. The disparity information for calculating the motion parameters can be derived based on coded depth maps.

One advantage of the concept presented now compared to conventional techniques for employing the motion data of already coded views is that the motion/disparity predictors are completely derived based on coded motion and disparity/depth information, without assuming any particular structure of the disparity field. At no point, it is not assumed that the disparity field can be well approximated by constant translational or affine parameters for an image; instead actually coded disparity information are used for accessing the motion of an already coded view. Further, it is not assumed that the disparity of a macroblock is similar to the disparity of neighboring blocks which assumption is unsecure. By using actually coded depth/disparity information, the concept provides suitable disparity estimates for blocks at object boundaries. Further, since no assumption that the motion of the current block is similar to that of neighboring blocks; is made, improved motion parameter predictors at object boundaries are provided. Furthermore, the concept does not require any transmission of disparity corrections, further, the concept does not require modifying the actual motion/disparity compensation process of hybrid video coding designs for being built into same. Only the derivation of motion parameters and/or motion parameter predictors is changed, so that it can be included in conventional video coding designs without any big modification and has a small complexity. In addition it should be noted that the concept is applicable to the coding with and without depth maps. Coded depth maps are used for improving the accuracy of the employed disparity data. The concept described hereinafter can be decomposed into the following steps:

Derivation of depth/disparity data for the current picture of the current view.

Derivation of candidate motion or disparity data for a current block based on the derived depth/disparity data.

Coding of the motion or disparity data for a current block.

In the following, these steps including advantageous embodiments are described in more detail. All steps are described for block-based motion compensation with translational motion vectors. The concept is, however, also applicable to more general schemes in which a generalized set of samples (e.g., a non-rectangular part of a block, or any other shape) is associated with a unique set of motion parameters; and it is also applicable for coding schemes in which the motion compensation is carried out using higher order motion models (e.g., affine motion models, or other N-parameter motion models).

Figure 3:
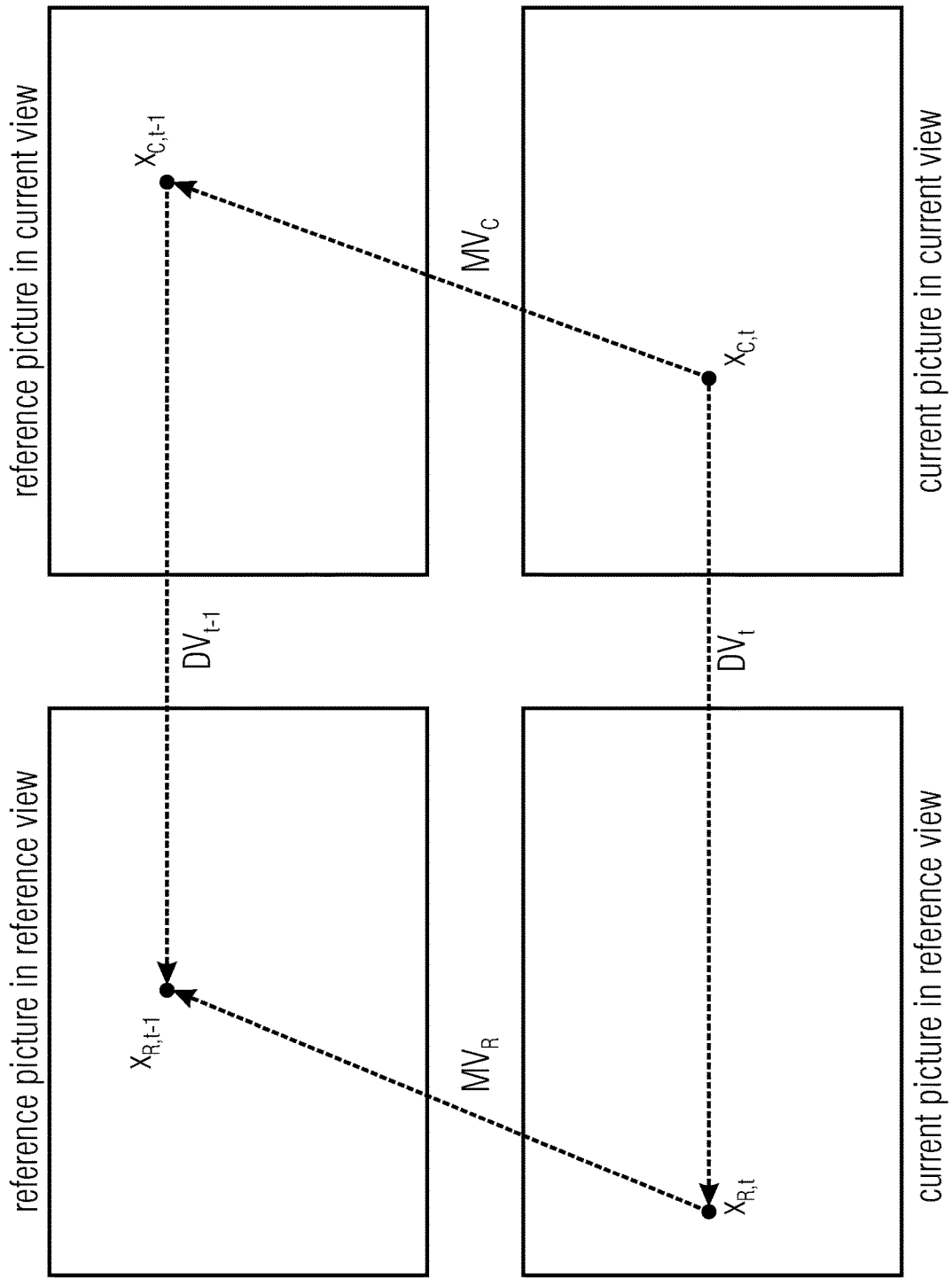
FIG. 3 shows a general relationship between projected objects points, temporal motion vectors, and disparity vectors in the pictures of different views and time instances.

Before describing the details of the concept, we briefly describe the advantage and underlying thoughts also valid for the above, more generic embodiment. The basic relationship between the projection of a real-world object point in different views and at different time instances in illustrated in FIG. 3. Assuming we know the real motion inside the views and the real disparities between views, the corresponding motion and disparity vectors are given as follows:

the motion vector for the current view is given by the difference of the locations of the projected object point in the reference picture of the current view and the current picture of the current view, $MV_c(x_{c,t}) = x_{c,t-x} - x_{c,t}$ the motion vector for the reference view is given by the difference of the locations of the projected object point in the reference picture of the reference view and the current picture of the reference view, $M_{3/4}(x_{R,t}) = *R$, $t \sim x_{s,t}$ the disparity vector for the current time instant is given by the difference of the locations of the projected object point in the current picture of the reference view and the current picture of the current view, $DV(xc,t) = x_{R,t} - *c \cdot r$ the disparity vector for the reference time instant is given by the difference of the locations of the projected object point in the reference picture of the reference view and the reference picture of the current view, $DV_{t-1}(xc,t_{-1}) = x_{R,t-1} - x_{c,t-1}$ Hence, we have the following relationship between the motion and disparity vectors:

$$MV_c(x_{c,t})_- + DVt_{-1}(x_{c,t-1}) - MVR(x_{R,t}) - DVt(x_{c,t}) = 0$$

If three of the motion and disparity vectors are given, the fourth vector can be calculated by a simple addition. In particular, the temporal motion vector for the current view can be derived according to $$MV_c(x_{c,t}) = M^3/4(^3/4,t) + DV_t(x_{c,t}) - DV_{t-1}(x_{c,t-1})$$

if the motion vector of the same object point in the reference picture as well as the disparity vectors at both time instants are given. In most cases, the motion vector (or motion parameters) for the reference view are given, because this view is already coded using motion-compensated prediction. But the disparities are usually not given, they can only be estimated. However, by using two estimated values the accuracy of the final results may be quite inaccurate and not suitable for deriving sufficiently accurate temporal motion vector predictors. But in general, it is justified to assume that the depth an object point (distance of the real-world object point from the camera) is nearly constant between the time instances corresponding to the current and the reference picture (the object motion from or to the camera between two successive pictures is usually much smaller than the distance of the object to the camera). Then, also the disparities are nearly constant and the relationship between the motion vectors simplifies to $$MV_c(x_{c,t}) \approx MVR(x_{R,t}) = MV_g(x_{c,t} + DVt(x_{c,t}))$$

It should be noted that we still need an estimate for the disparity in the current access unit (current time instant) in order to prediction the motion inside the current view based on the motion inside the reference view. However, the accuracy of the disparity estimate is less critical, since it is only used for accessing motion data in the reference view. The motion compensation operations as well as the coding of motion data is done based on blocks of multiple samples and, furthermore, the motion of neighboring samples or blocks is often very similar. Nonetheless, an accurate estimate of the disparity generally improves the prediction of motion parameters. The estimated disparity vector can also be used as a disparity vector for disparity-compensated prediction (i.e., using the picture of the current access unit in a reference view as reference picture), which can represent a special mode of the motion and disparity-based prediction of motion parameters.

Derivation of Candidate Motion or Disparity Data

In the following, we describe the basic derivation of motion data for a given block of the current picture in a particular view (that is not the backwards compatible base view) such as view 22 in FIG. 1, given motion data of an already coded reference view or of a set of already coded reference views such as 20 in FIG. 1. For this description, we assume that an estimate of the depth data for the current picture is given such as 64 in FIG. 1. Later, we describe how this depth estimate can be derived and how the derived motion data can be used for an efficient coding of the current view. The depth data 64 for the current picture are either given by a pixel-wise or a block-wise depth map. If a pixel-wise depth map is given, the depth map specifies a depth value for each sample (or each luminance sample) of the associated picture. If a block-wise depth map is given, the depth map specifies a depth value for an M×N block of samples (or luminance samples) for the associated picture. For example, a depth value for each block of the smallest possible block size (e.g., 4×4 or 8×8 block) that can be used for motion compensation could be specified. Conceptually, a depth value d given by a sample of the depth map, specifies a function of the real-world depth –, which is the distance between the associated real-world object point (the projection of the real-world object point is the image sample at the given position) and the camera:

$$d = f_{dz}(z)$$

The depth values are given with a particular precision (furthermore, depth values are often estimated, since the actual depths are usually not known). In most cases, depth values are given by integer numbers. Given the depth values and particular camera parameters (such as the focal length, distance between cameras, minimum and maximum depth values, or functions of these parameters), the depth value d can be converted into a disparity vector $$v = [v_x, v_y]^T : v(x) = f_{vd}(d(x)x],$$

where fvd specifies the function that maps a depth value d at sample location $x = [xv\_v]^T$ to a disparity vector. In a particular important setup is the one-dimensional parallel camera configuration, which is characterized by the following properties:

all cameras of the camera array are of the same type and have the same focal length
the optical axes of all cameras are parallel and lie inside the same plane
the scan lines of the image sensors are parallel to the plane that contains the optical axes In this case, the vertical component of the disparity vector is zero, $v = [p, o]^T$. Each real-world object point has the same vertical location in all views. Its horizontal location depends on the depth of the object point. The difference between the horizontal locations is given by the disparity $$r = f_{vd}(d).$$

In an important case, the relationship between the real-world depth z and the depth values d is given in a way that a linear relationship between the disparity v and the depth value d is obtained $$V = m_{vd} * d + n_{vd},$$

where $m_{vd}$ and $m_{vd}$ are given by the camera parameters. The depth values & are usually given as integer values. And for internal calculations it is usually also advantageous, if the obtained disparity values are integer values. For example, the disparity v can be expressed in the same units that is used for the motion/disparity vectors in motion/disparity-compensated prediction (e.g., half-, quarter, or eighth-sample accuracy). In this case, the integer values for the disparity can be obtained by the integer equation $$v = [(m]_{vd} * d + n_{vd})] >> u_v^d$$

where ">>" specifies a bit shift to the right (in two's complement arithmetic), and m zd and $n*_{vd}$ are scaled (and rounded) versions of $m_{vd}$ and $n_{vd}$, respectively.

Using the described basic relationships between the given depth values and the actually disparity, we describe advantageous embodiments for using motion information that are derived based on already coded motion information in one or more reference views and the given depth values.

Method 1: Switched Motion/Disparity Vector Prediction

In an advantageous embodiment of the invention, the underlying multiview video coding scheme such as for modules 24, 26, 80 and 82 includes a mode, in which the following parameters are transmitted as part of the bitstream 21:

reference picture index specifying a particular (temporal or inter-view) reference picture of a given a list of reference pictures. If the given list of reference pictures consists of a single element, this index is not transmitted but inferred at the decoder side. The reference picture include temporal and/or inter-view reference pictures.

a motion/disparity vector predictor index specifying a motion/disparity vector predictor of a given list of motion/disparity vector predictor candidates. If the list of motion/disparity vector predictor candidates consist of a single element, this index is not transmitted but inferred at the decoder side. For at least one block of a picture, the list of motion/disparity vector predictor candidates includes a motion/disparity vector that is derived based on given depth/disparity information and motion information in an already coded view.

In addition, a motion/disparity vector difference specifying the difference between the motion/disparity vector used for motion/disparity-compensated prediction and the chosen predictor (indicated by the transmitted index into the motion/disparity vector predictor candidate list) can be transmitted as part of the bitstream. In one embodiment, this motion/disparity vector difference can be coded independently of the reference index and the chosen predictor. In another embodiment of the invention, the motion/disparity vector difference is coded depending on the transmitted reference index and/or the chosen predictor. For example, a motion/disparity vector difference could only be coded if a particular motion/disparity predictor is chosen. The reference picture list and the motion/disparity vector predictor candidate list are derived in the same way at encoder and decoder side. In specific configurations, one or more parameters are transmitted in the bitstream, for specifying how the reference picture lists and/or motion/disparity vector predictor candidate lists are derived. For the advantageous embodiment of the invention, for at least one of the blocks of a picture in a dependent view such as 22, the list of motion/disparity vector predictor candidates contains a motion or disparity vector predictor candidate that is derived based on the given (estimated) depth values or based on the given (estimated) depth value and the motion parameters of an already coded view. Beside the motion/disparity vector predictor that is derived based on the given depth values and motion parameters of already coded views, the candidate list of motion/disparity vectors predictors may contain spatially predicted motion vectors (for example, the motion/disparity vector of a directly neighboring block (left or above block), a motion/disparity vector that is derived based on the motion/disparity vectors of directly neighboring blocks) and/or temporally predicted motion/disparity vectors (for example, a motion/disparity vector that is derived based on the motion/disparity vector of a co-located block in an already coded picture of the same view). The derivation of the motion/disparity vector candidate that is obtained by using the given depth data 64 and the already coded motion parameters such as 42 of other views such as 20 can be performed as described in the following.

Derivation Based on the Derivation of a Representing Depth for the Current Block In a first advantageous embodiment of the invention, first a representing depth value d for the given block 50 is obtained based on the given sample-based or block-based depth map. In one advantageous embodiment, a particular sample location x of the given block 50, which may be the top-left sample, the bottom-right sample, a middle sample, or any other particular sample, is considered. The depth value $\beta'=d(x)$ that is associated with the sample (as given by the given block-wise or sample-wise depth maps 64) is used as representing depth value. In another advantageous embodiment, two or more sample locations xi of the given block (for example, the corner samples or all samples) are considered and based on the associated depth values $d_i=d(x_i)$, a representing depth values d is calculated as a function of the depth values $d_i$. The representing depth value can be obtained by any function of the set of depth values $d_i$. Possible functions are the average of the depth values di; the median of the depth values $d_i$, the minimum of the depth values $d_i$, the maximum of the depth values $d_i$, or any other function. After obtaining the representing depth value d for the given block, the motion/disparity vector prediction proceeds as follows:

If the reference index that is coded for the block 50 refers to an inter-view reference picture (i.e., a coded picture at the same time instance as the current picture, but in an already coded view such as 20), the representing depth value is converted to a disparity vector based on given camera or conversion parameters as described above, $v=f_{vd}^{(d)}$, and the motion/disparity vector predictor is set equal to this disparity vector v.

Otherwise (the reference index refers to a temporal reference picture (i.e., an already coded picture of the same view (such as 22)), the motion vector predictor is derived based on a given reference view or a set of reference views such as 20. The reference view or the set of reference views are either determined by a particular algorithm or a signaled in the bitstream 14. As an example, the reference view can be the previously coded view for the same time instant, or it can be the already coded view (for the same time instant) that has the smallest distance to the current view, or any other of the already coded view determined by a particular algorithm. The set of already coded view can be the set of already coded views for the current time instant or any subset of this set.

If a single reference view is used, the motion vector predictor is derived as follows. Based on the camera parameters for the current view 22 and the reference view 20 or the corresponding conversion parameters, the representing depth d is converted into a disparity vector $v=f_{vd}^{(d)}$. Then, given the disparity vector v, a sample location $x_r$ the reference view 20 is determined. Therefore, a particular sample location $x_r$ of the current block 50 is considered, which may be the top-left sample of the block, the bottom-right sample, a middle sample, or any other sample of the block. The reference sample location $x_r$ is obtained by adding the disparity vector to the particular sample location inside the current block. If the disparity vector 47 is given with sub-sample accuracy, it is rounded to sample accuracy before it is added to the sample location. Given the reference sample location ˆ, the block 40 (a block is a set of sample that is associated with unique prediction parameters) in the picture $32t_1$ (at the current time instant as the current picture) of the reference view 20 that covers the reference sample location $x_r$ is determined. If this reference block 40 is coded in an inter-coding mode (i.e., a mode that employs motion-compensated prediction, including the SKIP or MERGE mode), the reference picture or reference pictures that are used for predicting this block are investigated. Let $\tau_{C,R}$ be the time instant of the reference picture (in the current view) that is referred to be the reference index that is coded for the current block 50. And let $\tau 1_{R,R}$ be the time instants of the reference picture that are used for predicting the reference block (which covers the sample location $x_r$) in the reference view 20. If one or more of the reference pictures that are used for predicting the reference block 40 are pictures at the same time instant as the reference picture given by the reference index for the current block 50 (i.e., if $\tau_{C,R}$ is equal to any of the values $\tau 1_{R,R}$), the corresponding motion vectors 42 are used for deriving the motion vector predictor for the current block 50. If exactly one of the time instants $\tau 1_{R,R}$ is equal to $\tau_{C,R}$, the motion vector predictor for the current block 50 is set equal to the motion vector 42 for the reference block 40 that is associated with the corresponding value of $\tau 1_{R,R}$. If two or more of the time $\tau 1_{R,R}$ instants Eks are equal to $\tau_{C,R}$ the motion vector predictor is set equal to a given function of the associated motion vectors for the reference block 40. A possible function is to use the first motion vector (in any particular order, e.g. by using the first hypotheses with $\tau 1_{R,R}=\tau_{C,R}$) another possible function is to use the average of the motion vectors, a further possible function is to use the median of the candidate motion vectors, or to use the median of the motion vector components for deriving all components of the motion vector predictor. If none of the associated reference pictures has a time instant $\tau 1_{R,R}$ equal to $\tau_{C,R}$ the motion vector predictor is marked as not available. In an advantageous embodiment of the invention, a non-available motion vector predictor is not included in the list of motion/disparity vector predictor candidates. In another advantageous embodiment of the invention, a non-available motion vector predictor is included in the list of motion/disparity vector predictor candidates for increasing the robustness of the parsing algorithm, but it cannot be chosen by an encoder. In another advantageous embodiment of the invention, a non-available motion vector predictor is replaced by another defined motion vector, which may be, for example, the zero vector, or a motion vector that is derived using the motion vectors of a neighboring block. Instead of the time instants $\tau 1_{R,R}$, $\tau_{C,R}$) other parameter that specify a similar measure can be used for determining whether a motion parameter set (consisting of a reference picture index and a motion vector) can be used for deriving the motion vector predictor. For example the picture order count (similarly defined as in H.264) could be used or the reference index could be used.

If a set of two or more reference views are used, the motion vector predictor can also be derived based on information in all reference views. In an advantageous embodiment, the reference views are ordered in a particular order. As an example, the reference views can be ordered in the order in which they are coded. Or as another example, the reference views are ordered in the order of increasing distances to the current view. Then, the first reference view of the ordered set is investigates and the corresponding motion vector predictor is derived. If this motion vector predictor is marked as available (i.e., it is not marked as not available), the motion vector predictor is used. Otherwise, if the motion vector predictor is marked as not available, the next reference view in the given ordered set is investigated, etc. In another advantageous embodiment of the invention, all reference views of the given set are investigated and the candidate set of motion vectors consists of all corresponding motion vectors that are associated with a reference picture for which the associated time instant $\tau 1_{R,R}$ is equal to $\tau_{C,R}$. The final motion vector predictor is then derived by a function of the set of candidate motion vectors. A possible function is to use the first motion vector (in any particular order), another possible function is to use the average of the motion vectors, a further possible function is to use the median of the candidate motion vectors, or to use the median of the motion vector components for deriving all components of the motion vector predictor.

Figure 4:
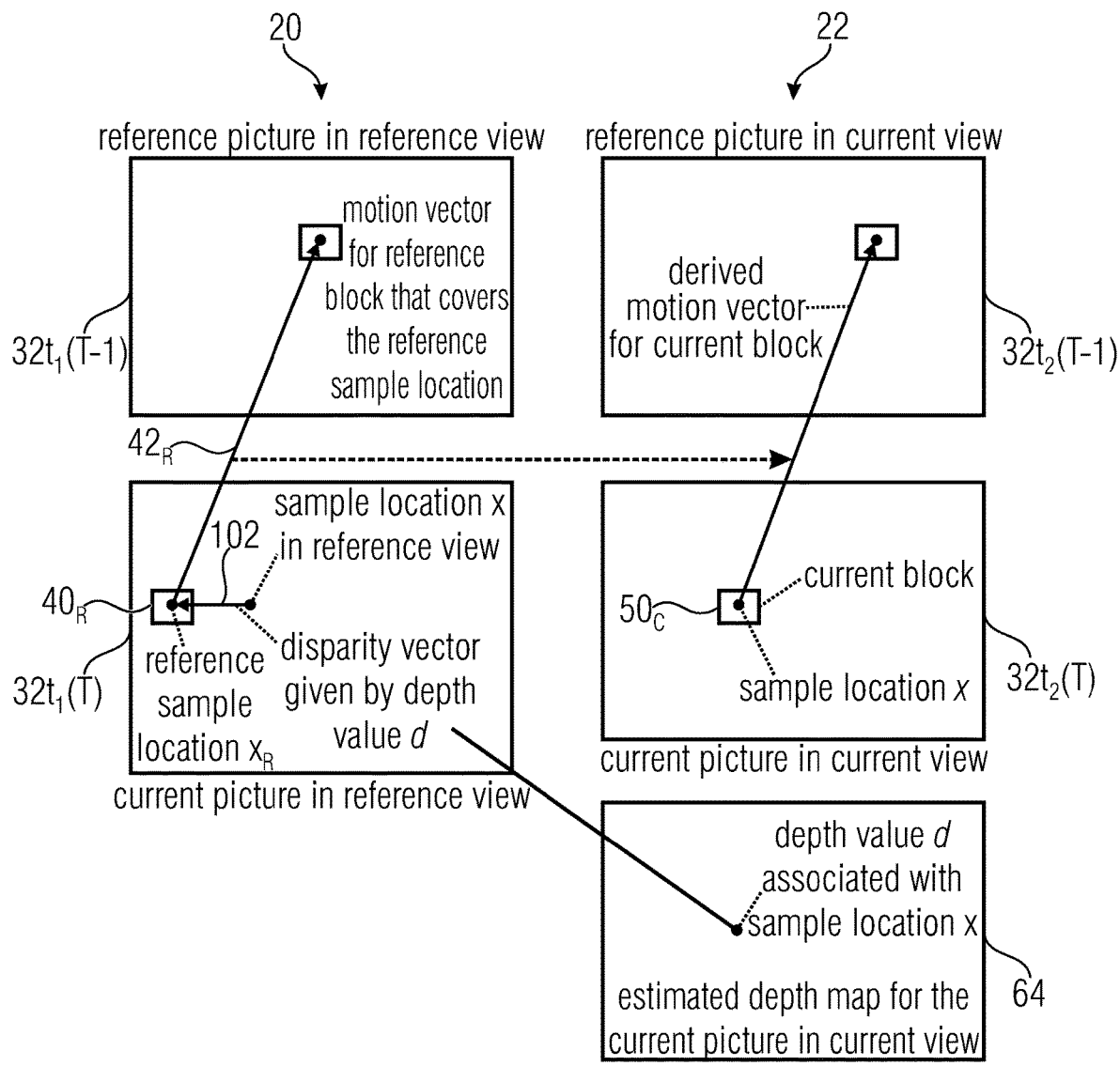
FIG. 4 shows a basic process for deriving a motion vector for the current block given the motion in a reference view and a depth map estimate for the current picture (using a particular sample position inside the current block)

For further illustration, the basic process for deriving a motion vector for the current block 50c given the motion in a reference view 20 and a depth map estimate for the current picture $32t_2(T)$ (using a particular sample position inside the current block 50c) is depicted in FIG. 4 using similar reference signs as in FIG. 1 in order to ease the mapping of the description of FIG. 4 onto FIG. 1 so as to serve as a possible source of more detailed explanation of possible implementations. Given a sample location x in the current block 50c and a depth value d for this sample location (which is given by the estimate 64 of the depth map), a disparity vector 102 is derived, and based on this disparity vector 102, a reference sample location $x_R$ in the reference view 20 is derived. Then, the motion parameters 42R of the block 40R in the reference view picture $32t_1(T)$ that covers the reference sample location –Ts are used as a candidate for the motion parameters for the current block 50c in the current view 22. Or alternatively, a subset of the motion parameters of the reference block is used for the current block 50c. If the reference index for the current block 50T is given, only motion parameters 42R of the reference block $40_R$ that refer to the same time instant T (or picture order count or reference index) as the given reference index for the current block 50c or considered.

Derivation Based on Multiple Depth Values for the Given Block

In a second advantageous embodiment of the invention, the current block 50c is not represented by a representing depth, but different depth values for different sample locations inside the block are derived and used for deriving a set of candidate motion vector predictors. Given the current block a set of sample locations are considered. The set of sample locations $x^i$ can include the top-left sample, the top-right sample, the bottom-right sample, the bottom-left sample, or a middle sample of the block. For each of the sample locations $x^i$, a depth value $d^i$ is assigned by the given depth map. Depending on whether the given reference index refers to an temporal or inter-view reference, the following applies.

If the reference index that is coded for the block 50c refers to an inter-view reference picture (i.e., a coded picture at the same time instance as the current picture, but in an already coded view), the depth values d; are converted to a disparity vectors based on given camera or conversion parameters as described above, $v\_=f_{vd}(d^i)$. Then, the motion/disparity vector predictor is derived as a function of these disparity vectors $v^i$. The motion/disparity vector predictor can be set equal to the disparity vectors $v^i$, that occurs most often, or it can be set to the median (or component-wise median) of the disparity vectors V, or it can be set to the average of the disparity vectors $v^i$, or it can be determined by any other function of the disparity vectors $v^i$.

Otherwise (the reference index refers to a temporal reference picture (i.e., an already coded picture of the same view)), the motion vector predictor is derived based on a given reference view or a set of reference views. For each sample location $x^i$, a depth value $d^i$ is derived and mapped to a disparity vector $v^i$. Then, for each disparity vector (marked as available), a motion vector $m^i$ is derived by any of the algorithms specified above (for the first advantageous embodiment). Then, the final motion vector predictor is given by a function of the motion vectors $m^i$. The motion vector predictor can be set equal to the motion vector $m^i$ that occurs most often, or it can be set to the median (or component-wise median) of the motion vectors $m^i$, or it can be set to the average of the motion vectors, or it can be determined by any other function of the motion vectors $m^i$ Method 2: Mode for which all Associated Motion Parameters are Derived In another advantageous embodiment of the invention, the multiview video coding scheme includes a coding mode, in which all motion parameters (including the number of hypotheses, the reference indices, and the motion vectors) are derived based on a given depth map 64 and the motion parameters 42 of an already coded view 20. In a particular embodiment of the invention, this mode can be coded as a candidate of a list of candidate motion parameters (as it is used in the merge syntax in the current HEVC working draft). That means, encoder and decoder derive a list of motion parameter candidates for a block in the same way, where one of the motion parameter candidates are the motion parameters that are derived based on the motion of an already coded view 20. Then, an index is coded that signals to the decoder which of these motion parameter candidates is used. In context of the merge syntax, it can be argued that the current block is merged with a "co-located" (in spirit of representing a similar content) block in a reference view. In another embodiment, a specific syntax element signals the usage of the new coding mode. In a slightly modified version, the number of motion hypotheses that are used for generating the prediction signal can be explicitly signaled inside the bitstream, and only the reference indices and the associated motion vectors are derived. In another modified version, motion vector differences can be additionally transmitted in order to refine the derived motion parameters.

Derivation Based on Multiple Potential Reference Indices

In a first advantageous embodiment of the invention, the derivation of the motion parameters for the current block 50c uses any of the concepts described for method 1 above and considers more than one potential reference index. In the following, we first describe how a reference index for a particular motion hypothesis (and reference list) and the associated motion vector can be derived. As a first step, an ordered set of reference indices for a given reference list is determined. This can be for example just a single reference index (e.g., the first index for the reference list or the first index representing a temporal reference picture), or it can consist of the first two indexes of the reference list, or it can consists of all reference indices of the reference list, or it can consist of the first reference index that represents a temporal reference picture and the first reference index that is not equal to the first reference index that represents a temporal reference picture (i.e., the second temporal reference picture in the list or the first inter-view reference picture). Any other defined set of reference indices is possible. Given the ordered set of reference indices, the first reference index is considered and a motion vector for this reference index is derived by any of the embodiments described for method 1 above. If the derived motion vector is marked as not available, the next reference index is considered and the corresponding motion vector is derived. This process is continued until an available motion vector is returned or all reference indices of the list have been tested. If no available motion vector is found, the final motion parameters are marked as not available. In one configuration, not available motion parameters are not inserted into the candidate list of motion parameters. In a second configuration, not available motion parameters are inserted into the candidate list of motion parameters (for parsing robustness), but an encoder is not allowed to choose not available motion parameters. In a third configuration, a not available motion parameters are replaced by particular motion parameters, which may be, for example, a zero reference index and a zero motion vector or a reference index and motion vector that are derived based on the motion parameters in a spatial neighborhood of the current block. If the new coding mode is signaled by a particular syntax element and the derived motion parameters are not available, the corresponding syntax element is either not transmitted (and the coding mode is not used) or the encoder is not allowed to select the value for the syntax element that specifies the usage of the new coding mode or the not available motion parameters are replaced by a particular motion parameters (see above).

If the number of motion hypotheses or the number of used reference lists is explicitly coded, a set of motion parameters consisting of a reference index and a motion vector is determined for each motion hypothesis or reference list as specified above.

If the number of motion hypotheses or the number of used reference lists is not explicitly coded, the number of motion hypotheses or the employed reference lists are also derived based on the actual coded motion parameter in the reference view(s). Given a maximum number of motion hypotheses or the maximum set of reference lists that can be used, for each of the motion hypothesis (reference lists) a set of motion parameters is derived as described above. Then, the number of motion hypotheses (set of used reference picture lists) is given by the hypotheses (reference lists) for which the derived motion parameters are marked as available. As an example, if we have two potential motion hypotheses and for both motion hypotheses a valid set of motion parameters (reference index and motion vector) is derived, the new coding mode specifies bi-prediction with the derived motion parameters. If, however, only for one of the hypotheses (reference lists) a valid set of motion parameters is derived, the new coding mode specifies uni-directional prediction (one hypothesis) with the set of valid motion parameters. If for none of the motion hypotheses (reference lists) a valid set of motion parameters is derived, the complete set of motion parameters is marked as not available. In this case, the set of motion parameters is either not added to the list of candidate motion parameters, or it is added (for parsing robustness) but not used by an encoder, or it is replaced by a particular defined set of motion parameters (e.g., with one motion hypothesis, a reference index equal to 0 and a motion vector equal to 0). It would also be possible to check another set of reference indices for one or more of the potential motion hypotheses.

Derivation Based on a Single Representing Depth Value

In a second advantageous embodiment of the invention, first a reference block in the reference view is derived and then the motion parameters of this block are used as motion parameter candidates for the current block. Here, the number of motion hypotheses as well as the reference indices and motion vectors are copied from the reference block in the reference view. The basic concept for this embodiment is illustrated in FIG. 4 and has been briefly described above. First, a representing depth value d, and based on this depth value a disparity vector, and a reference sample location xe are derived by any of the algorithms described for method 1. Then, the block (also referred as reference block) in the reference view that covers the reference sample location is considered. The motion parameters for the current block (or one candidate for the motion parameters) are set equal to the motion parameters of the derived reference block. It is also possible that the motion parameters (in particular the reference indices and the number of motion hypotheses) are modified, for example in the following scenarios:

- If the reference picture list for the reference view is constructed in a different way than the reference picture list for the current view (i.e., a particular reference index does not always refer to the same access unit for both lists), a reference index for the current block can be modified in a way that it refers to a picture at the same time instant (or a picture with the same picture order count) as the corresponding reference picture in the reference view.
- If a reference index in the reference view refers to an inter-view reference picture, the reference index for the current view can be modified in a way that it also refers to a selected inter-view reference picture (for example, the same inter-view reference picture as the current view or the reference picture that is represented by the reference view). In this case, also the motion vector has to be replaced with a disparity vector, which can be obtained by converting the representing depth d to a disparity vector.
- If not for all reference pictures that used in the reference block a corresponding picture (same time instant or picture order count or reference index) is available in the reference list for the current block, the motion hypotheses that refer to reference pictures that are not available for the current blocks can be considered as not existing.
- If the reference block is intra coded, the motion parameters can be replaced with motion parameters for disparity compensated prediction. For example, the reference index can be set in a way that it refers to the reference view picture and the motion vector can be set equal to the disparity vector that is obtained by converting the representing depth d to a disparity vector. As an alternative, the motion parameters could be marked as not available.

Combination with Method 1

In an embodiment, the coding mode described by an embodiment for method 1 (coding of reference index, derivation of a motion vector or motion vector predictor) can be supported in addition to a coding mode described by an embodiment of method 2 (derivation of all motion parameters including the number of motion hypotheses, reference indices, and motion vectors or motion vector predictors).
Method 3: Mode for which all Associated Motion Parameters as Well as the Block Partitioning are Derived In another advantageous embodiment of the invention, the multiview video coding scheme includes a coding mode, in which different motion parameters for subblocks of the given block are derived based on the motion parameters in an already coded reference view such as 20 and an estimated depth map 64. Or in other words, the multiview video coding scheme includes a coding mode for a block, in which the partitioning of the block 50c into smaller subblocks as well as the motion parameters associated with the subblocks are derived based on the motion parameters in an already reference view and an estimated depth map.

For this coding mode, a minimum block size is defined, which may be equal to the minimum block size that is supported for motion/disparity-compensated prediction or may be a multiple of the minimum block size that is supported for motion/disparity-compensated prediction. If the given current block 50c is smaller or equal to the defined minimum block size, the current block 50c is not split into smaller block for the purpose of motion/disparity compensation and the associated motion parameters are derived as described for any of the embodiments for method 2 above. If the given current block is larger than the defined minimum block size, it is split into subblocks that have a size equal to the defined minimum block size. For each of these subblocks, a set of motion parameters is derived using any of the embodiments for method 2 described above.

If the motion parameters for any of the subblocks are marked as not available (for example, because the corresponding reference block 40R is coded in an intra-mode or it only uses inter-view prediction), they can be replaced by motion parameters of any of the neighboring subblocks for which the motion parameters are available. Such an algorithm can operate in a way that neighboring blocks are tested in specific defined order (which may depend on the location of the subblocks to be replaced), and the motion parameters of the subblock to be replaced are set equal to the motion parameters of the first subblock in the specified order that has valid motion parameters.

In a particular embodiment of the invention, the obtained subblocks with a given minimum block size specify the partitioning of the given current blocksS0c. In another embodiment of the invention, the obtained subblocks can be combined based on the associated motion parameters in order to form larger blocks that are used for motion/disparity-compensated prediction. The combination of subblocks can proceed in a hierarchical fashion. Therefore, in the first hierarchy stage, sets of four neighboring blocks can be considered. If the number of motion hypotheses and the associated reference pictures and motion vectors are the same for all four subblocks, the four subblocks are summarized to a larger block (with motion parameters that are identical to the motion parameters of the original subblocks). In the next hierarchy stage, four blocks of the next hierarchy level (consisting of 4 original subblocks) are considered. If all four blocks have been summarized to larger blocks in the previous hierarchy stage and the number of motion hypotheses and the associated reference pictures and motion vectors are the same for all four blocks, these four blocks are again summarized to a larger block (with motion parameters that are identical to the motion parameters of the original subblocks). This algorithm in continued up to the highest possible hierarchy level for the given current block. In the extreme case (if the motion parameters of all subblocks are the same), the entire current block is not split but associated with a unique set of motion parameters. In a slightly modified version, 4 blocks are also summarized to a larger block if the motion vectors are not be exactly the same, but the difference (which may be defined as maximum component difference or the absolute value of the vector difference) between the motion vectors is less or equal to a defined threshold (the number of motion hypotheses and the employed reference pictures is still the same). In this case, the motion vectors that are associated with the larger block are determined as a function of the motion parameters of the 4 subblocks. Possible functions are the average of the motion vectors, the median (or component-wise median) of the motion vectors, the motion vector of any particular subblock, or the motion vector that occurs most often in the four subblocks).

In an embodiment of the invention, the coding mode described by an embodiment for method 1 (coding of reference index, derivation of a motion vector or motion vector predictor) can be supported in addition to a coding mode described by an embodiment of method 3 (derivation of the blocks splitting as well as all motion parameters including the number of motion hypotheses, reference indices, and motion vectors or motion vector predictors). In addition, a coding mode according to any embodiment of method! may be supported.

Coding of Motion and Disparity Data

As already described above, the usage of coding modes representing embodiments of the invention, needs to be signaled to the decoder. This can be realized in different ways. In one version, a particular syntax element (which may be a flag) can be inserted into the syntax, which signals whether a conventionally derived motion vector predictor (or motion vector or motion parameter set) is used or whether a motion vector predictor (or motion vector or motion parameter set) that has been derived using a depth map estimate and motion parameters of an already coded view is used. In another version, the motion vector predictor (or motion vector or motion parameter set) that has been derived using a depth map estimate and motion parameters of an already coded view can be inserted into a candidate list of conventionally derived motion vector predictors (or motion vectors or motion parameter sets) and an index is transmitted which signals which motion vector predictor (or motion vector or motion parameter set) is used. The particular syntax element or the index into a candidate list can be transmitted using fixed-length coding, variable-length coding, arithmetic coding (including context-adaptive binary arithmetic coding), or PIPE coding. If context-adaptive coding is used, the context can be derived based on the parameters (for example, the particular syntax element or the index into a candidate list) of neighboring blocks.

In an advantageous embodiment of the invention, the multiview video coding scheme includes a coding mode for which one or more motion hypotheses are signaled by transmitting a reference picture index, a motion vector predictor index, and a motion vector difference for each motion hypothesis. For this coding mode, a list of candidate motion vector predictors is derived based on the transmitted reference picture index and the transmitted index signals which one of the motion vector candidates is used. By using the embodiment, one of the motion vector candidates (for at least one block) is derived based on a depth map estimate and motion parameters of an already coded view (see method 1 above). In a slightly modified version, a motion vector difference is not transmitted but inferred to be equal to 0 (either for all motion vector candidates or only for the motion vector candidate that has been derived based on a depth map estimate and motion parameters of an already coded view.

In another advantageous embodiment of the invention, the multiview video coding scheme includes a coding mode for which one or more motion hypotheses are signaled by transmitting motion parameter index (or merge index). For this coding mode, a list of candidate sets of motion parameters (including the number of motion hypotheses, the reference indices, and motion vectors) is derived. By using the embodiment, one of the candidate sets of motion parameters (for at least one block) is derived based on a depth map estimate and motion parameters of an already coded view (see methods 2 and 3 above). In a particular version of this embodiment, the candidate set of motion parameters (for at least one block) that is derived based on a depth map estimate and motion parameters of an already coded view includes partitioning information for the current block (see method 3 above). In a slightly modified version of this embodiment, motion vector differences can additionally be transmitted (potentially depending on the selected set of motion parameters).

In another embodiment of the invention, the multiview video coding scheme includes a coding mode corresponding to method 2 or 3 and the syntax includes a flag which specified whether this coding mode is used.

Derivation of Depth Map Estimates for the Current Picture

The derivation of motion parameters for a block of the current picture 50$c$ based on the motion parameters of already coded views such as 20, as described so far, involves that an estimate 64 of the depth map for the current picture is available. As mentioned above, this depth map estimate 64 can specify a sample-wise depth map (a depth value is specified for each sample of the current picture) or a block-wise depth map (a depth value is specified for blocks of samples). The depth map estimate 64 may be derived based on already coded parameters, such as depth maps or disparity vectors and motion parameters. In principle, the depth map estimate may be derived based on actually coded depth maps. This was the case discussed above with respect to FIGS. 1 and 2 for which the following description in so far provides individually transferrable details regarding individual aspects. The corresponding methods described below involve that the coded depth maps are present in the bitstream (before they are used). Methods of an alternative class, not discussed further here, do not require that depth maps are coded as part of the bitstream. Instead, the depth map estimate is derived based on coded disparity vectors. The second class of procedures could be applied independently of whether depth maps are coded as part of a bitstream. It should also be noted that, when depth maps are coded, both classes of methods can be applied. It is also possible to select different methods for different frames. In the following, the basic concept and advantageous embodiments for deriving depth maps estimates (with and without coded depth maps) are described, however, merely with regard to the first class which description serves as an extension of the description of FIGS. 1 and 2.

Derivation Based on Coded Depth Maps

If the depth map that is associated with the current picture 32$t2$(T) would be coded before the current picture, the reconstructed depth map could directly be used as an estimate of the real depth map for the current picture. It is also possible to pre-process the coded depth map (e.g., by applying a filtering it) and use the result of the pre-filtering as the estimate of the depth map that is used for deriving motion parameters.

In most configurations, the depth map 34$d_2$(T) that is associated with a particular picture is coded after the picture 32$t_2$(T) (often directly after the associated picture). Such a configuration allows that coding parameters (such as motion parameters) that are transmitted for coding the conventional video pictures can be used for predicting the coding parameters that are used for coding the depth maps, which improves the overall coding efficiency. But in such a configuration, the depth map that is associated with a picture cannot be used as an estimate for the depth map in deriving the motion parameters 54. However, the depth map 34$d1$(T) for an already coded view (of the same access unit) such as 20 is usually available and can be used for deriving an estimate of the depth map 34$d_2$(T) of the current picture. At least, the depth map 34$d_1$(T) of the base view (independent view) 20 is available before coding any dependent view 22. Since the depth map of any view represents the geometry of the projected video scene to some extent (in combination with camera parameters such as focal length and the distance between cameras) it can be mapped to another view. Consequently, if the depth map for the current picture 32$t_2$(T) is not available, the coded depth map 34$d_1$(T) for an already coded view of the same access unit 20 is mapped to the current view and the result of this mapping is used as depth map estimate.

In the following we describe a particular algorithm for realizing this mapping 66. As described above, each depth value d corresponds to a displacement vector ^ between two given views. Given transmitted camera or conversion parameters, a depth value d can be converted to a displacement vector my the mapping $v=f_{vd}^{(d)}$. Hence, given a depth value d at a particular sample location $x_R$ in the reference depth map 34$d_1$(T) (already coded), the sample location $X_c$ of the same depth value in the current depth map 34$d_2$(T) is obtained by adding the disparity vector to $x_R=x_c=x_s+v$. Hence, each depth value of the reference depth map can be mapped to a sample location of the current depth map 34$d_2$(T) in order to obtain a depth map estimate 64 for the current picture 34$t_2$(T). However, since parts of objects that are visible in one view are not visible in another view, there are sample location in the depth map 34$d_2$(T) for the current view 22 to which more than one depth values is assigned and there are sample location in the depth map for the current view to which no depth values is assigned. These sampled location may be processed as follows:

If more than one depth value is assigned to a particular sample location, it means that a foreground object is displaced in front of a background object. Consequently, the depth value d (of the potential depth values) that represents the smallest distance to the camera is assigned to such a sample location.

If more no depth value is assigned to a particular sample location, it means that a foreground object has moved and the previously covered background is visible. The best that can be done for such regions is to assume that the disoccluded background has the same depth than the neighboring background samples. Hence, regions to which no depth value has been assigned are filled with the depth value of the surrounding samples that represents the largest distance to the camera.

This algorithm is specified in more detail in the following. For simplifying the following description, we assumed that larger depth values represent smaller distances to the camera than smaller depth values (but the algorithm can easily be modified for the opposite assumption):

1. All samples of the depth map (estimate) for the current picture are set to an undefined depth value (e.g., −1).
2. For each sample location $x_R$ of the reference depth map, the following applies:
   a. The depth value d at the sample location $x_R$ is converted to a disparity vector v using the given camera or conversion parameters, the disparity vector v is rounded to sample accuracy (if applicable), and the sample location inside the current picture is derived by $x_c = x_r + v = x_r + [\text{round}\{f-^{(d)}\}]$.
   b. If the depth value at sample location in the current picture has an undefined value, the depth value at sample location is set equal to the depth value d.
   c. Otherwise, if the depth value at sample location *£ in the current picture has a defined value $d_x$ with $d_x < d$, the depth value at sample location is modified and set equal to the depth value d.
3. The regions in the current depth map that have undefined depth values are filled by a particular hole filling algorithm. For such a hole filling algorithm, the depth value of the background that is uncovered in the current view is derived based on the samples of the surrounding depth values. As an example, the smallest depth map value of the surrounding samples can be assigned. But more sophisticated hole filling algorithms are possible.

Figure 5:
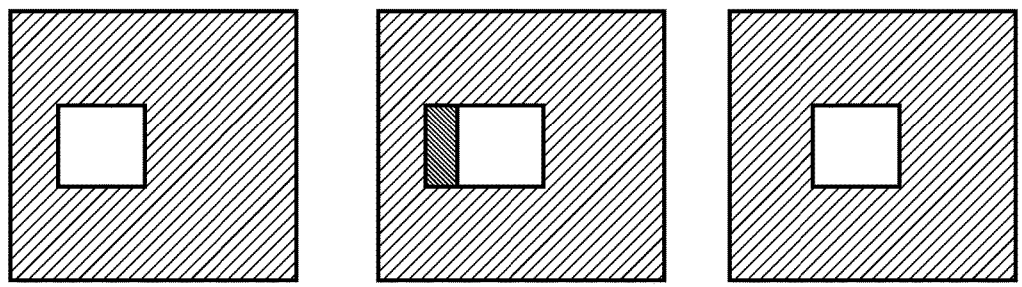
FIG. 5 shows a basic process for mapping a depth map given for one view to another view: (left) given depth map for a view, where the grey area represents a background and white area represents a foreground object; (middle) converted depth map obtained by displacing the samples with the disparity vectors that corresponds to the depth values and keeping the foreground object for locations to which more than one sample is projected, the black area represents on disoccluded area to which no sample has been projected; (right) converted depth map after filling the disoccluded areas by the depth value for the background.

The algorithm for mapping a depth map of a given view to a different view is further illustrated in FIG. 5 on the basis of a very simple example. FIG. 5 illustrates a possible process for mapping a depth map such as $32t_1(T)$ given for one view 20 to another view 22. At the left hand side, the given depth map for the reference view is shown, where the shaded area represents a background and the white area represents a foreground object; in the middle of FIG. 5, middle, the converted depth map obtained by displacing the samples of the given map with the disparity vectors that correspond to the depth values and keeping the foreground object for locations to which more than one sample is projected, is shown. The black area represents on disoccluded area to which no sample has been projected. FIG. 5, right, shows the converted depth map after filling the disoccluded areas by the depth value for the background, i.e. by background filling.

In a particular embodiment of the invention, the hole filling can realized by a particularly simple algorithm which processes the lines of the converted depth map separately. For each line segment that consists of successive undefined depth values, the two surrounding values are considered, and all depth samples of the line segment are replaced with the smaller of these two depth values (background depth). If the line segment has only one surrounding depth value (because it is located at the image border), the depth samples of the line segment are replaced with this value. If complete lines have undefined values after this process, the same process is applied for the columns of the depth map.

Although the algorithm above has been described for sample-wise depth maps, it can also be applied to block-wise depth maps (resulting in a lower complexity) or the given sample-wise depth map for the reference view can first be converted into a block-wise depth maps (by downsampling) and then the algorithm can be applied for the block-wise depth map.

Regarding the afore-outlined description of methods 1-3, it should be noted that these different alternatives of polishing up the motion or motion/disparity vector/parameter candidate list by adding respective information gained from a block, such as block $40_R$ in the reference view, would also be advantageous if used with other types of determining the disparity vector used to identify the respective block $40_R$ of the reference view. In accordance with this embodiment, the depth estimator 28 in the decoder of FIG. 1 would be optional, just as the depth estimator 84 in the encoder of FIG. 2 would be.

In particular, in accordance with the latter aspect, the above description of methods 1-3 also revealed an apparatus for reconstructing a multi-view signal into a multi-view data stream, the apparatus comprising a dependent-view reconstructor 26, which is configured to do the following in order to reconstruct the dependent-view 22. Reference is made to the schematic illustrations of the multi-view signal of FIGS. 1 and 4, in order to describe the functionality. In particular, the dependent-view reconstructor 26 derives, for a current block 50c of a current picture $32t_2(T)$ and the dependent view 22, a list of motion vector predictor candidates by firstly determining a disparity vector 102 for current block 50c representing a disparity between the current picture $32t_2(T)$ of the dependent view 22 and the current picture $32t_1(T)$ of the reference view 20 of the multi-view signal at block 50C. In order to do so, the dependent-view reconstructor 26 uses a depth-map associated with a previously decoded portion of the multi-view signal. The depth-map would be explicitly signaled within the multi-view signal in addition to the motion and/disparity vectors for a picture to which the depth-map belongs. In the other embodiments outlined above, the depth-map associated with the current picture $32t_1(T)$ of the reference view was used as a basis for determining the disparity vector 102, and in this regard the above description shall be incorporated for the current embodiment as well, but in principle, other possibilities exist as well. For example, the depth-map of a previously decoded picture of the dependent view could be used as a basis. For example, the dependent-view reconstructor 26 could spatially/temporally predict a motion vector for the current block 50c and could preliminarily use this predicted motion vector as a means for accessing the depth map 34d2 of the previously decoded picture of the dependent view 22 at a portion which corresponds to the current block 50c of the current picture $32t_2$, derive a representative depth value therefrom and use this depth value d in order to determine the disparity vector 102 by depth-to-disparity conversion as described above. Or as another alternative, the depth map associated with dependent view picture could be coded before the picture, and this depth map could be directly used by a depth-to-disparity conversion as described above for a current block of the current dependent view picture.

Then, the dependent-view reconstructor 26 determines block 40R within the current picture of the reference view using the determined disparity vector 102, and adds a motion vector to the list of motion vector predictor candidates, which depends on the motion vector associated with the determined block 40R, i.e. motion vector 42R.

As described above, in deriving the list of motion vector predictor candidates, the dependent-view reconstructor could also be configured to spatially and/or temporally predict one or more further motion vectors from spatially and/or temporally neighboring blocks of the dependent view 22, i.e. blocks spatially and/or temporally neighboring current blocks 50c. The one or more further motion vectors or a version derived therefrom would then be added to the list of motion vector predictor candidates by the dependent-view reconstructor 26.

The dependent-view reconstructor extracts, for block 50c, index information specifying one of the list of motion vector predictor candidates from the multi-view data stream and, in order to be more specific, from the dependent-view portion 22 thereof. As it is assumed that the current block 50c is subject to motion-compensated prediction, i.e. is associated with a temporal prediction mode, the dependent-view reconstructor 26 reconstructs block 50c by performing a motion-compensated prediction of block 50c using a motion vector which is equal to, or at least depends on, the specified motion vector candidate, i.e. the one indexed or specified by the index information. The overhead associated with the enlarged list of motion predictor candidates is comparatively low compared to the gain in motion vector prediction quality resulting from the adding of the motion vector candidate 42R determined from the reference view.

As has also been described above, the motion information extracted by the dependent-view reconstructor 26 for the current block 50c need not be restricted to the index information. Rather, the dependent-view reconstructor 26 could further be configured to extract, for block 50c, a motion vector difference in relation to the specified motion vector candidate and to perform the reconstruction of block 50c such that the used motion vector further depends on a sum of the motion vector difference and the specified motion vector candidate, i.e. the one specified by the index information out of the list of motion vector predictor candidates.

In the above, motion- and disparity-compensated prediction have been strictly distinguished. However, the difference between both may vanish if, for example, the same mode is used to signal both, with the difference between both merely being derivable from an index indexing the picture relative to which the motion/compensated prediction is to be performed. Then, the just-described functionality of the decoder dependent-view reconstructor could be rewritten by replacing "motion" with "motion/disparity" as there would be no difference. Naturally, the measures should be taken so that the vector candidate actually specified refers to the same type of previously coded picture, i.e. temporally preceding or in view direction preceding, or that the even the adding to the list is restricted conditionally performed accordingly.

According to the above-described method 1, the dependent-view reconstructor 26 is configured to extract for block 50c, further a reference picture index specifying a reference picture of a list of reference pictures, comprising the current picture $32t_1(T)$ of the reference view 20 and the already decoded pictures $32t_2(t<T)$ of the dependent view 22, and the dependent-view reconstructor 26 may be configured to, with the reference pictures as one of the already decoded pictures of the dependent view 22, perform the motion-compensated prediction using the one already decoded picture of the dependent view as specified by the reference picture index as a reference, and if the reference picture is the current picture $32t_1(T)$ of the reference view, add the determined disparity vector 102 or a modified disparity vector derived from the determined disparity vector 102 to a list of disparity vector prediction candidates, extract index information specifying one of the list of disparity vector predictor candidates from the multi-view data stream and reconstruct block 50c by performing a disparity-compensated prediction of block 50c using a disparity vector which depends on the specified disparity vector candidate using the current picture $32t_1(T)$ of the reference view 20 as a reference. Again, the difference between motion-compensated and disparity-compensated prediction could be dissolved. The same prediction mode could be signaled for block 50c.

As to whether motion-compensated or disparity-compensated prediction is actually performed by the dependent-view reconstructor 26, would be defined by the reference picture index which indexes into a buffer or list of reference pictures containing both, temporal predecessors, i.e. previously decoded pictures of the dependent view, as well as view predecessors, i.e. previously decoded pictures of other views.

As became clear from method 2, the dependent-view reconstructor 26 could also be configured to perform the derivation of the list of motion vector predictor candidates via a list of motion/disparity vector predictor candidates being a list of motion/disparity parameter candidates each including a number of hypotheses, and, per hypothesis, a motion/disparity motion vector and a reference index specifying a reference picture out of such a common list of reference pictures just-outlined. The dependent-view reconstructor may then be configured to add motion/disparity parameters to the list of motion/disparity parameter candidates which depend on motion/disparity parameters associated with a determined block $40_R$, and to reconstruct block 50c by performing motion/disparity-compensated prediction on block 50C using motion/disparity parameters which depend on a motion/disparity parameter candidates specified by the index information. The motion parameters could, as described above, concurrently determine the number of hypotheses, and a reference index, and a motion/disparity vector difference per hypothesis. As has also been described above, the number of hypotheses could be determined beforehand such as by way of the type of the picture.

And as described in method 3, the dependent-view reconstructor may additionally be configured to additionally adopt the partitioning for block 50C from block 50R as far as the motion/disparity prediction is concerned.

The encoder of FIG. 2 would, in accordance with the latter aspect, be configured to act accordingly in encoding the multi-view signal into the multi-view data stream. In particular, the dependent-view reconstructor 26 would derive, for block 50c, a list of motion vector predictor candidates in the same manner. That is, a disparity vector for block 50c representing a disparity between the current picture of the dependent view 22 and the current picture of the reference view 20 of the multi-view signal at the current picture of the dependent view 22 would be determined via a depth map explicitly signaled within the multi-view signal in addition to motion and/disparity vectors for a picture to which the depth map belongs. Then, a block $50_R$ within the current picture of the reference view would be determined using the determined disparity vector, and a motion vector be added to the list of motion vector predictor candidates, which depends on a motion vector associated with the determined block of the picture of the reference view. The dependent view reconstructor would insert, for block $50_c$, index information specifying one of the list of motion vector predictor candidates, into the multi-view data stream, and encode the block $50_c$ by performing a motion-compensated prediction of the block $50_c$ using a motion vector which depends on the specified motion vector candidate.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ITU-T and ISO/IEC JTC 1, "Advanced video coding for generic audiovisual services," ITU-T Recommendation H.264 and ISO/IEC 14496-10 (MPEG-4 AVC), 2010.
[2] A. Vetro, T. Wiegand, G. J. Sullivan, "Overview of the Stereo and Multiview Video Coding Extension of the H.264/MPEG-4 AVC Standard", *Proceedings of IEEE*, vol. 99, no. 4, pp. 626-642, April 2011.
[3] H. Schwarz, D. Marpe, T. Wiegand, "Overview of the Scalable Video Coding Extension of the H.264/AVC Standard", *IEEE Transactions on Circuits and Systems for Video Technology*, vol. 17, no. 9, pp. 1103-1120, September 2007.

What is claimed:

1. An apparatus for reconstructing a multi-view signal coded into a data stream, comprising:
    a depth estimator configured to obtain, using a processor, a depth map estimate of a current picture in a dependent view of the multi-view signal based on information from the data stream; and
    a dependent-view reconstructor configured to, using the processor:
        determine a disparity vector for at least one block of blocks of the current picture in the dependent view of the multi-view signal based on the depth map estimate, the disparity vector representing a disparity between the current picture of the dependent view and a current picture of a reference view of the multi-view signal at the at least one block of the current picture of the dependent view;
        derive, for the at least one block of the current picture of the dependent view, a list of motion vector predictor candidates by:
            determining a block within the current picture of the reference view using the disparity vector, and
            adding a motion vector to the list of motion vector predictor candidates based on information associated with the determined block of the current picture of the reference view; and
        identify, for the at least one block of the current picture of the dependent view, a motion vector predictor candidate from the list of motion vector predictor candidates; and
        reconstruct the at least one block of the current picture of the dependent view by performing a motion-compensated prediction of the at least one block of the current picture of the dependent view using a motion vector which depends on the identified motion vector predictor candidate.

2. The apparatus according to claim 1, wherein the dependent-view reconstructor is configured to extract, for the at least one block of the current picture of the dependent view, from the data stream index information specifying the motion vector predictor candidate from the list of motion vector predictor candidates.

3. The apparatus according to claim 1, further comprising:
a reference-view reconstructor configured to reconstruct a depth map of the current picture of the reference view of the multi-view signal from a reference view depth-map portion of the multi-view data stream, wherein:
the depth estimator is configured to estimate the depth map of the current picture of the dependent view by warping the depth map of the current picture of the reference view into the dependent view, and
the dependent-view reconstructor is configured to, in determining the disparity vector for the at least one block, subject the depth data estimate at the at least one block to depth-to-disparity conversion to acquire the disparity vector.

4. The apparatus according to claim 1, wherein the dependent-view reconstructor is configured to extract, for the at least one block of the current picture of the dependent view, a motion vector difference in relation to the identified motion vector predictor candidate and to perform the reconstruction of the at least one block of the current picture such that the used motion vector further depends on a sum of the motion vector difference and the identified motion vector predictor candidate.

5. The apparatus according to claim 1, wherein the dependent-view reconstructor is configured to extract for the at least one block of the current picture of the dependent view, a reference picture index specifying a reference picture of a list of reference pictures comprising the current picture of the reference view and already decoded pictures of the dependent view,
wherein the dependent-view reconstructor is configured to, if the reference picture is one of the already decoded pictures of the dependent view, perform the motion-compensated prediction using the one already decoded picture of the dependent view as a reference, and if the reference picture is the current picture of the reference view, add the disparity vector or a modified disparity vector derived from the disparity vector to a list of disparity vector prediction candidates, extract index information specifying one disparity vector predictor candidate of the list of disparity vector predictor candidates from the multi-view data stream and reconstruct the at least one block of the current picture of the dependent view by performing a disparity-compensated prediction of the at least one block of the current picture of the dependent view using a disparity vector which depends on the specified disparity vector candidate using the current picture of the reference view as a reference.

6. The apparatus according to claim 1, wherein the dependent-view reconstructor is further configured to, in deriving the list of motion vector predictor candidates, spatially and/or temporarily predict a further motion vector from spatially and/or temporarily neighboring blocks of the dependent view and add the further motion vector or a version derived from the further motion vector to the list of motion vector predictor candidates.

7. The apparatus according to claim 1, wherein the dependent-view reconstructor is configured to perform the derivation of the list of motion vector predictor candidates via a list of motion/disparity vector predictor candidates being a list of motion/disparity parameter candidates each comprising a number of hypotheses, and, per hypothesis, a motion/disparity motion vector and a reference index specifying a reference picture out of a list of reference pictures comprising the current picture of a reference view and previously decoded pictures of the dependent view, wherein the dependent-view reconstructor is configured to add motion/disparity parameters to the list of motion/disparity parameter candidates which depend on motion/disparity parameters associated with the determined block of the current picture of the reference view, and to reconstruct the at least one block of the current picture of the dependent view by performing motion/disparity-compensated prediction on the at least one block of the current picture of the dependent view using motion/disparity parameters which depend on a motion/disparity parameter candidate specified by the index information.

8. An apparatus for encoding a multi-view signal into a data stream, comprising:
a depth estimator configured to obtain, using a processor, a depth map estimate of a current picture in a dependent view of the multi-view signal; and
a dependent-view encoder configured to, using the processor:
determine a disparity vector for at least one block of blocks of the current picture in the dependent view of the multi-view signal based on the depth map estimate, the disparity vector representing a disparity between the current picture of the dependent view and a current picture of a reference view of the multi-view signal at the at least one block of the current picture of the dependent view;
derive, for the at least one block of the current picture of the dependent view, a list of motion vector predictor candidates by:
determining a block within the current picture of the reference view using the disparity vector, and
adding a motion vector to the list of motion vector predictor candidates which depends on information associated with the determined block of the picture of the reference view; and
encode the at least one block of the current picture of the dependent view by performing a motion-compensated prediction of the at least one block of the current picture of the dependent view using a motion vector which depends on a certain motion vector predictor candidate from the list of motion vector predictor candidates.

9. The apparatus according to claim 8, wherein the dependent-view encoder is configured to insert, into the data stream, index information specifying the certain motion vector predictor candidate from the list of motion vector predictor candidates for the at least one block of the current picture of the dependent view.

10. The apparatus according to claim 8, further comprising:
a reference-view encoder configured to encode a depth map of the current picture of the reference view of the multi-view signal into a reference view depth-map portion of the multi-view data stream, wherein:
the depth estimator is configured to estimate the depth map of the current picture of the dependent view by warping the depth map of the current picture of the reference view into the dependent view, and
the dependent-view encoder is configured to, in determining the disparity vector for the at least one block, subject the depth data estimate at the at least one block to depth-to-disparity conversion to acquire the disparity vector.

11. A method for encoding a multi-view signal into a data stream, comprising:
obtaining a depth map estimate of a current picture in a dependent view of the multi-view signal;

determining a disparity vector for at least one block of blocks of the current picture in the dependent view of the multi-view signal based on the depth map estimate, the disparity vector representing a disparity between the current picture of the dependent view and a current picture of a reference view of the multi-view signal at the at least one block of the current picture of the dependent view;

deriving, for the at least one block of the current picture of the dependent view, a list of motion vector predictor candidates by:
  determining a block within the current picture of the reference view using the disparity vector, and
  adding a motion vector to the list of motion vector predictor candidates which depends on information associated with the determined block of the picture of the reference view; and encoding the at least one block of the current picture of the dependent view by performing a motion-compensated prediction of the at least one block of the current picture of the dependent view using a motion vector which depends on a certain motion vector predictor candidate from the list of motion vector predictor candidates.

12. The method according to claim 11, further comprising:
  inserting, into the data stream, index information specifying the certain motion vector predictor candidate from the list of motion vector predictor candidates for the at least one block of the current picture of the dependent view.

13. The method according to claim 11, further comprising:
  encoding a depth map of the current picture of the reference view of the multi-view signal into a reference view depth-map portion of the multi-view data stream, wherein the depth map of the current picture of the dependent view is estimated by warping the depth map of the current picture of the reference view into the dependent view; and
  in determining the disparity vector for the at least one block, subjecting the depth data estimate at the at least one block to depth-to-disparity conversion to acquire the disparity vector.

14. A method for storing a data stream, comprising storing on a digital storage medium, a data stream into which a multi-view signal is encoded by the method according to claim 11.

* * * * *